(12) United States Patent
Colombo et al.

(10) Patent No.: US 11,977,424 B2
(45) Date of Patent: May 7, 2024

(54) PROCESSING SYSTEM, RELATED INTEGRATED CIRCUIT, DEVICE AND METHOD

(71) Applicants: STMicroelectronics Application GmbH, Aschheim-Dornach (DE); STMicroelectronics S.r.l., Agrate Brianza (IT)

(72) Inventors: Roberto Colombo, Munich (DE); Nicolas Bernard Grossier, Oreno di Vimercate (IT)

(73) Assignees: STMicroelectronics Application GmbH, Aschheim-Dornach (DE); STMicroelectronics S.r.l., Agrate Brianza (IT)

( * ) Notice: Subject to any disclaimer, the term of this patent is extended or adjusted under 35 U.S.C. 154(b) by 201 days.

(21) Appl. No.: 17/702,529

(22) Filed: Mar. 23, 2022

(65) Prior Publication Data

US 2022/0308645 A1 Sep. 29, 2022

(30) Foreign Application Priority Data

Mar. 25, 2021 (IT) .................. 102021000007379

(51) Int. Cl.
*G06F 1/24* (2006.01)
(52) U.S. Cl.
CPC ..................... *G06F 1/24* (2013.01)
(58) Field of Classification Search
CPC ........................................... G06F 1/24
See application file for complete search history.

(56) References Cited

U.S. PATENT DOCUMENTS

| | | |
|---|---|---|
| 6,067,627 A | 5/2000 | Reents |
| 6,573,753 B1 | 6/2003 | Snyder |
| 2010/0176870 A1 | 7/2010 | Kohamada |
| 2012/0169370 A1 | 7/2012 | Oh |
| 2013/0176065 A1 | 7/2013 | Balmelli |

FOREIGN PATENT DOCUMENTS

WO 2020036481 A1 2/2020

OTHER PUBLICATIONS

IT Search Report and Written Opinion for priority application, IT Appl. No. 102021000007379, dated Dec. 7, 2021, 8 pgs.

*Primary Examiner* — Zahid Choudhury
(74) *Attorney, Agent, or Firm* — Crowe & Dunlevy LLC

(57) ABSTRACT

A processing system includes a reset circuit, a memory storing configuration data, and a hardware configuration circuit transmitting the configuration data to configuration data clients. The system executes a reset phase, configuration phase, and software runtime phase. First and second reset terminals are associated with first and second circuitries which are respectively associated with configuration data clients. The configuration data includes first and second mode configuration data for the first and second terminals. During the reset and configuration phase, the first circuitry activates a strong pull-down, and the second circuitry activates a weak pull-down. During the software runtime phase, the first circuitry activate a weak pull-down for implementing a bidirectional reset terminal or activates a weak pull-up resistance for implementing a reset output terminal, and the second circuitry activates a weak pull-up for implementing a reset input terminal or activates a strong pull-up for implementing a reset output terminal.

25 Claims, 7 Drawing Sheets

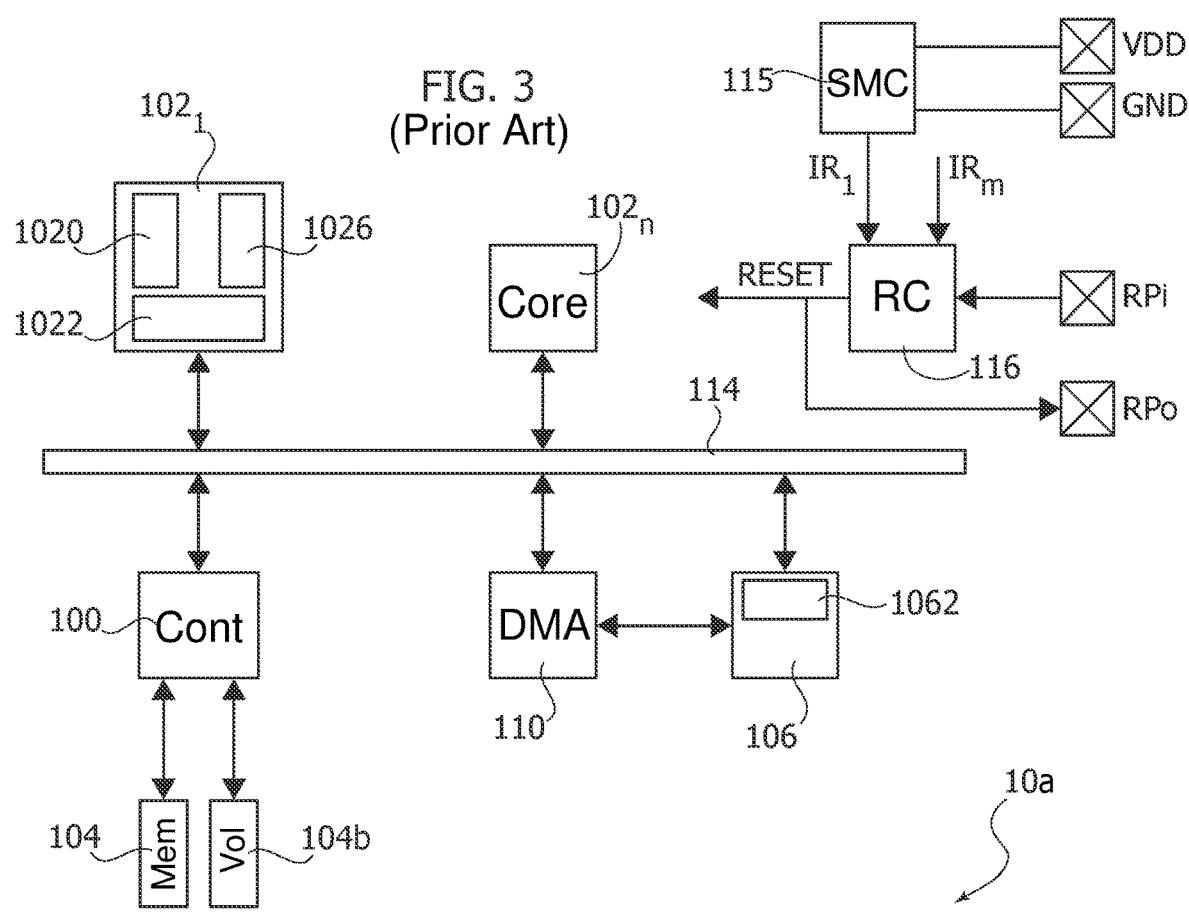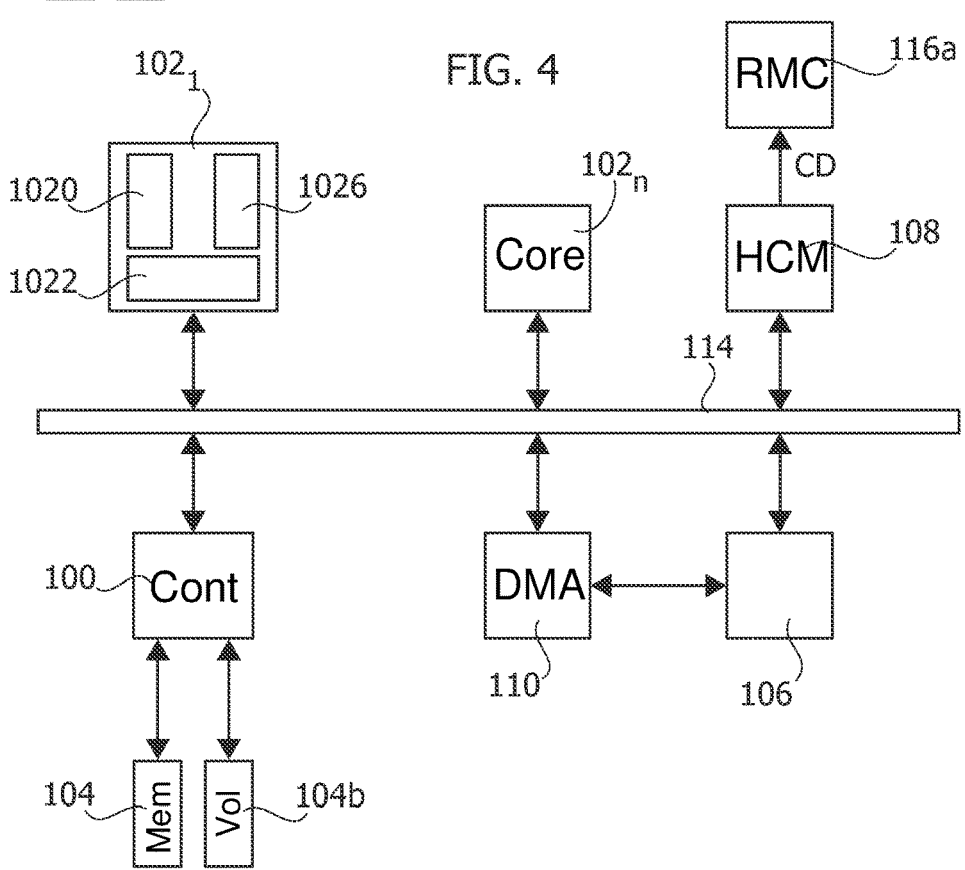

PROCESSING SYSTEM, RELATED INTEGRATED CIRCUIT, DEVICE AND METHOD

PRIORITY CLAIM

This application claims the priority benefit of Italian Application for Patent No. 102021000007379, filed on Mar. 25, 2021, the content of which is hereby incorporated by reference in its entirety to the maximum extent allowable by law.

TECHNICAL FIELD

Embodiments of the present disclosure relate to the management of the reset of processing systems, such as microcontrollers.

BACKGROUND

FIG. 1 shows a typical electronic system, like the electronic system of a vehicle, comprising a plurality of processing systems (PS) 10, such as embedded systems or integrated circuits. Such processing systems 10 may include, for example, a Field Programmable Gate Array (FPGA), a Digital Signal Processor (DSP), and/or a microcontroller (e.g., dedicated to the automotive market).

For example, in FIG. 1 three processing systems 101, 102 and 103 are shown and connected through a suitable communication system 20. For example, the communication system may include a vehicle control bus, such as a Controller Area Network (CAN) bus, and possibly a multimedia bus, such as a Media Oriented Systems Transport (MOST) bus, connected to vehicle control bus via a gateway. Typically, the processing systems 10 are located at different positions of the vehicle and may include, e.g., an Engine Control Unit, a Transmission Control Unit (TCU), an Antilock Braking System (ABS), a Body Control Module (BCM), and/or a navigation and/or multimedia audio system. Accordingly, one or more of the processing systems 10 may also implement real-time control and regulation functions. These processing systems are usually identified as Electronic Control Units (ECUs).

FIG. 2 shows a block diagram of an exemplary digital processing system 10, such as a microcontroller, which may be used as any one of the processing systems 10 of FIG. 1.

In the example considered, the processing system 10 comprises a microprocessor 102, usually the Central Processing Unit (CPU), programmed via software instructions. Typically, the software executed by the microprocessor 102 is stored in a non-volatile program memory (Mem) 104, such as a Flash memory or EEPROM. Thus, the memory 104 is configured to store the firmware of the processing unit 102, wherein the firmware includes the software instructions to be executed by the microprocessor 102. Generally, the non-volatile memory 104 may also be used to store other data, such as configuration data, e.g., calibration data.

The microprocessor 102 usually has an associated volatile memory (Vol) 104b, such as a Random-Access-Memory (RAM). For example, the memory 104b may be used to store temporary data.

As shown in FIG. 2, usually the communication with the memories 104 and/or 104b is performed via one or more memory controllers (Cont) 100. The memory controller(s) 100 may be integrated in the microprocessor 102 or connected to the microprocessor 102 via a communication channel, such as a system bus of the processing system 10. Similarly, the memories 104 and/or 104b may be integrated with the microprocessor 102 in a single integrated circuit, or the memories 104 and/or 104b may be in the form of a separate integrated circuit and connected to the microprocessor 102, e.g., via the traces of a printed circuit board.

In the example considered, the microprocessor 102 may have one or more associated hardware resources 106 selected from the group of: one or more communication interfaces IF, e.g., for exchanging data via the communication system 20, such as a Universal Asynchronous Receiver/Transmitter (UART), Serial Peripheral Interface Bus (SPI), Inter-Integrated Circuit ($I^2C$), Controller Area Network (CAN) bus, and/or an Ethernet interface, and/or a debug interface.

The one or more associated hardware resources 106 may also be selected from the group including: one or more analog-to-digital converters AD and/or digital-to-analog converters DA; and/or one or more dedicated digital components DC, such as hardware timers and/or counters, or a cryptographic co-processor; and/or one or more analog components AC, such as comparators, sensors, such as a temperature sensor, etc.; and/or one or more mixed signal components MSC, such as a PWM (Pulse-Width Modulation) driver.

Generally, a dedicated digital component DC may also correspond to a FPGA integrated in the processing system 10. For example, in this case, the memory 104 may also comprise the program data for such a FPGA.

Accordingly, the digital processing system 10 may support different functionalities. For example, the behavior of the microprocessor 102 is determined by the firmware stored in the memory 104, e.g., the software instructions to be executed by a microprocessor 102 of a microcontroller 10. Thus, by installing a different firmware, the same hardware (microcontroller) can be used for different applications.

In this respect, future generations of such processing systems 10, e.g., microcontrollers adapted to be used in automotive applications, are expected to exhibit an increase in complexity, mainly due to the increasing number of requested functionalities (new protocols, new features, etc.) and due to the tight constraints of execution conditions (e.g., lower power consumption, increased calculation power and speed, etc.).

For example, recently more complex multi-core processing systems 10 have been proposed. Such multi-core processing systems may be used to execute (in parallel) several of the processing systems 10 shown in FIG. 1, such as several processing systems of a vehicle.

FIG. 3 shows an example of a multi-core processing system 10. Specifically, in the example considered, the processing system 10 comprises a plurality of n processing cores (Core) $102_1, \ldots, 102_n$ connected to an (on-chip) communication system 114. For example, in the context of real-time control systems, the processing cores $102_1, \ldots, 102_n$ may be ARM Cortex®-R52 cores. Generally, the communication system 114 may comprise one or more bus systems, e.g., based on the Advanced eXtensible Interface (AXI) bus architecture, and/or a Network-on-Chip (NoC).

For example, as shown at the example of the processing core $102_1$, each processing core 102 may comprise a microprocessor 1020 and a communication interface 1022 configured to manage the communication between the microprocessor 1020 and the communication system 114. Typically, the interface 1022 is a master interface configured to forward a given (read or write) request from the microprocessor 1020 to the communication system 114 and forward an optional response from the communication system 114 to the microprocessor 1020. However, the communication interface 1022 may also comprise a slave interface. For example, in this way, a first microprocessor 1020 may send a request to a second microprocessor 1020 (via the communication interface 1022 of the first microprocessor, the communication system 114 and the communication interface 1022 of the second microprocessor).

Generally, each processing core $102_1, \ldots, 102n$ may also comprise further local resources, such as one or more local memories 1026, usually identified as Tightly Coupled Memory (TCM).

As mentioned before, typically the processing cores $102_1, \ldots, 102n$ are arranged to exchange data with a non-volatile memory 104 and/or a volatile memory 104b. In a multi-core processing system 10, often these memories are system memories, i.e., shared for the processing cores $102_1, \ldots, 102n$. As mentioned before, each processing core $102_1, \ldots, 102_n$ may, however, comprise one or more additional local memories 1026.

For example, as shown in FIG. 3, the processing system 10 may comprise one or more memory controllers 100 configured to connect at least one non-volatile memory 104 and at least one volatile memory 104b to the communication system 114. As mentioned before, one or more of the memories 104 and/or 104b may be integrated in the integrated circuit of the processing system 10 or connected externally to the integrated circuit. For example, the processing system 10 may comprise: a first volatile memory 104b integrated in the integrated circuit of the processing system 10 and connected to the communication system 114 via a first memory controller 100, and a second volatile memory 104b external with respect to the integrated circuit of the processing system 10 and connected to the communication system 114 via a second memory controller 100.

As mentioned before, the processing system 10 may comprise one or more resources 106, such as one or more communication interfaces or co-processors (e.g., a cryptographic co-processor). The resources 106 are usually connected to the communication system 114 via a respective communication interface 1062. In general, the communication interface 1062 comprises at least a slave interface. For example, in this way, a processing core 102 may send a request to a resource 106 and the resource returns given data. Generally, one or more of the communication interfaces 1062 may also comprise a respective master interface. For example, such a master interface 1064 may be useful in case the resource has to start a communication in order to exchange data via a read and/or write request with another circuit connected to the communication system 114, such as a resource 106 or a processing core 102. For example, for this purpose, the communication system 114 may indeed comprise an Advanced Microcontroller Bus Architecture (AMBA) High-performance Bus (AHB), and an Advanced Peripheral Bus (APB) used to connect the resources/peripherals 106 to the AMBA AHB bus.

Often such processing systems 10 comprise also one or more Direct Memory Access (DMA) controllers 110. For example, as shown in FIG. 3, a DMA controller 110 may be used to directly exchange data with a memory, e.g., the memory 104b, based on requests received from a resource 106. For example, in this way, a communication interface IF may directly read data (via the DMA controller 110) from the memory 104b and transmit these data, without having to exchange further data with a processing unit 102. Generally, a DMA controller 110 may communicate with the memory or memories via the communication system 114 or via one or more dedicated communication channels.

In this respect, regardless of the complexity of the processing system 10 (e.g., with respect to the number of processing cores 102 and/or number and type of the resources 106), a typical processing system 10 also comprises a reset generator or management circuit 116.

Specifically, the reset circuit (RC) 116 is configured to generate a reset signal RESET, which is provided to the various circuits of the processing system 10, in particular the circuits comprising registers or other volatile memory elements, e.g., implemented with flip-flops and/or latches.

In fact, as well known in the art, such volatile memory elements of the processing system 10 may be configured to load a reset value in response to the reset signal RESET, thereby bringing the processing system 10 into a known (reset) state.

As shown in FIG. 3, the reset circuit 116 may be configured to generate the reset signal RESET in response to at least one of: one or more internal signals $IR_1, \ldots, IR_m$ indicative of given events, or reset requests; and one or more signals provided by respective input terminals RPi, such as pads of a respective die of the integrated circuit comprising the processing system 10 or pins of a respective packaged integrated circuit.

For example, an internal signal, e.g., the internal signal $IR_1$, may be set when the processing system 10 is switched on, i.e., when a supply voltage is applied to given supply terminals of the processing system, such as a positive supply terminal VDD and a ground terminal GND. For example, the processing circuit 10 may comprise for this purpose a power supply monitoring circuit (SMC) 115 configured to generate a trigger in the signal $IR_1$, when the supply voltage applied to the terminals VDD and GND increase above a given threshold value. For example, the power supply monitoring circuit 115 may comprise for this purpose a comparator, e.g., a comparator with hysteresis, i.e., a Schmitt trigger. Accordingly, in this way, the processing system 10 is reset when the processing system 10 is switched on.

Similarly, by using the internal signals IR, also other circuits may request a reset of the processing system 10, such as: a processing core 102, e.g., by writing the content of a register via software instructions executed by the processing core 102; or a peripheral or resource 106, such as an error management circuit, which may be configured to request a reset in case of given error events.

Similarly, an external circuit (external with respect to the integrated circuit comprising the processing system 10) may use the reset pin/pad RPi to reset the processing system 10.

Often the processing system 10 also comprises an output terminal/pin/pad RPo for also providing the signal RESET to an external circuit (external with respect to the integrated circuit comprising the processing system 10).

Often, instead of using two separate terminals RPi and RPo, a single bidirectional terminal is used. The selection and use of the terminals (or respective signals in case of a bidirectional terminal) RPi and RPo usually depends on the final application.

The above configuration, e.g., with respect to the number of reset terminals RPi and/or reset terminals RPo, the use of unidirectional input or output terminal, or bidirectional terminals, etc., is usually selected during the design phase of the processing system 10 and then hardwired.

However, such a hardwire configuration may not always be useful. For example, in case a terminal RPo is not connected to another external circuit, such a terminal would be rather useless.

There is accordingly a need in the art to provide approaches for managing reset input and/or output terminals of a processing system in a more convenient manner.

SUMMARY

One or more embodiments relates to a processing system. Embodiments moreover concern a related integrated circuit, device, and method.

As mentioned before, various embodiments relate to a processing system, e.g., implemented in an integrated circuit. In various embodiments, the processing system comprises a digital processing core including a microprocessor configured to execute software instruction and a reset circuit configured to selectively reset the processing system.

In various embodiments, the processing system also comprises a non-volatile memory having stored configuration data, a plurality of configuration data clients, wherein each configuration data client comprises a register for storing configuration data, and a hardware configuration circuit configured to read the configuration data from the non-volatile memory and to transmit the configuration data to the plurality of configuration data clients.

In various embodiments, in response to switching on the processing system, the processing system is configured to execute a reset stage and a software runtime stage/phase. Specifically, the reset stage comprises a reset phase, in which the reset circuit executes a reset of the processing system in order to initialize the various circuits of the processing system (such as the configuration data clients), and a configuration phase, in which the hardware configuration circuit reads the configuration data from the non-volatile memory and transmits the configuration data to the at least one configuration data client. Finally, in the software runtime phase, the microprocessor is started and executes software instruction.

In various embodiments, the processing system may be configured to execute one or more further phases between the configuration phase and the software runtime phase. For example, in a diagnostic stage/phase, a diagnostic circuit of the processing system may execute one or more diagnostic operations. In a further reset phase, the reset circuit may execute a further reset of the processing system. In a further configuration phase, the hardware configuration circuit may again read the configuration data from the non-volatile memory and transmit the configuration data again to the at least one configuration data client. Finally, in a wait phase, the processing system may wait until an external reset signal received via a reset terminal of the processing system is de-asserted.

The previously described reset in response to a power on reset may thus correspond to a complex reset, wherein the first reset represents a destructive reset, while the optional further reset may represent a functional reset. For example, the processing system may be configured to monitor a first reset request signal, and in response to determining that the first reset request signal is set, execute a destructive reset, e.g., execute the first reset stage (comprising the reset phase and the configuration phase), a diagnostic phase, a second reset stage (comprising the further reset phase and the further configuration phase) and the software runtime phase. In various embodiments, the processing system may be configured to monitor a second reset request signal, and in response to determining that the second reset request signal is set, execute a functional reset, e.g., execute the second reset stage (comprising the further reset phase and the further configuration phase) and the software runtime phase.

In various embodiments, the processing system comprises two types of reset terminals. Specifically, the first reset terminal has a first terminal control circuitry associated therewith, wherein the first circuitry comprises an input stage configured to generate a first binary (input) signal as a function of the voltage at the first reset terminal. Conversely, in order to set the logic level of the first reset terminal, the first terminal control circuitry may comprise (at least) a pull-up resistance connected to the first reset terminal and configured to be selectively activated, a first pull-down resistance connected to the first reset terminal and configured to be selectively activated, and a second pull-down resistance connected to the first reset terminal and configured to be selectively activated, wherein the second pull-down resistance has a resistance value being smaller than the resistance value of the first pull-down resistance. Thus, essentially, the first pull-down resistance corresponds to a weak pull-down and the second pull-down resistance corresponds to a strong pull-down.

For example, in order to implement the pull-up and pull down resistances, the first circuitry may comprise a pull-up resistor connected via a first electronic switch to the first reset terminal, thereby implementing the pull-up resistance, a first pull-down resistor connected via a second electronic switch to the first reset terminal, thereby implementing the first pull-down resistance, and a second pull-down resistor connected via a third electronic switch to the first reset terminal, thereby implementing the second pull-down resistance. Alternatively, the first circuitry may comprise a pull-up resistor connected via a first electronic switch to the first reset terminal, thereby implementing the pull-up resistance, a pull-down resistor connected via a second electronic switch to the first reset terminal, thereby implementing the first pull-down resistance, and an output stage configured to selectively connect the first reset terminal to a ground, thereby implementing the second pull-down resistance, i.e., the second pull-down resistance may correspond to the resistance of the electronic switch used to connect the first reset terminal to a ground.

In various embodiments, the second reset terminal has a second terminal control circuitry associated therewith, wherein the second circuitry comprises an input stage configured to generate a second binary (input) signal as a function of the voltage at the second reset terminal. Conversely, in order to set the logic level of the second reset terminal, the second terminal control circuitry may comprise (at least) a first pull-up resistance connected to the second reset terminal and configured to be selectively activated, a second pull-up resistance connected to the second reset terminal and configured to be selectively activated, wherein the second pull-up resistance has a resistance value being smaller than the resistance value of the first pull-up resistance, a first pull-down resistance connected to the second reset terminal and configured to be selectively activated, and a second pull-down resistance connected to the second reset terminal and configured to be selectively activated, wherein the second pull-down resistance has a resistance value being smaller than the resistance value of the first pull-down resistance. Thus, essentially, the first pull-up resistance corresponds to a weak pull-up and the second pull-up resistance corresponds to a strong pull-up. Similarly, the first pull-down resistance corresponds to a weak pull-down and the second pull-down resistance corresponds to a strong pull-down.

For example, similar to the first terminal control circuit, the second terminal control circuit may comprise for this purpose a first pull-up resistor connected via a first electronic switch to the second reset terminal, thereby implementing the first pull-up resistance, a second pull-up resistor connected via a second electronic switch to the second reset terminal, thereby implementing the second pull-up resistance, a first pull-down resistor connected via a third electronic switch to the second reset terminal, thereby implementing the first pull-down resistance, and a second pull-down resistor connected via a fourth electronic switch to the second reset terminal, thereby implementing the second pull-down resistance. Alternatively, the second terminal control circuitry may comprise a pull-up resistor connected via a first electronic switch to the second reset terminal, thereby implementing the first pull-up resistance, a pull-down resistor connected via a second electronic switch to the second reset terminal, thereby implementing the first pull-down resistance, and an output stage configured to selectively connect the first reset terminal to a supply voltage or a ground, thereby implementing the second pull-up resistance and the second pull-down resistance.

In various embodiments, the first and second circuitry use a given default configuration. Specifically, in various embodiments, during the reset stage (i.e., the reset phase and the configuration phase), the first circuitry is configured to activate the second (strong) pull-down resistance of the first circuitry and the second circuitry is configured to activate the first (weak) pull-down resistance of the second circuitry. The reason for this default configuration will be described in greater detail in the following.

In various embodiments, the default configuration may however be changed via the configuration data. Specifically, in various embodiments, the first circuitry and the second circuitry have at least one configuration data client associated therewith, wherein the configuration data comprises first mode configuration data for the first terminal and second mode configuration data for the second terminal, whereby the first mode configuration data and the second mode configuration data are transmitted to the at least one configuration data client during the configuration phase.

Accordingly, once the first and second mode configuration have been provided to the first circuitry and the second circuitry, i.e., at the end of the configuration phase and in particular during the software runtime phase, the first circuitry and the second circuitry may use a different configuration for the reset terminals.

For example, the first terminal control circuitry may be configured to activate the first (weak) pull-down resistance of the first circuitry when the first mode configuration data indicates that the first terminal should be configured as a bidirectional reset terminal. Specifically, as will be described in greater detail in the following, this permits maintaining the device under reset when the first reset terminal is disconnected. Conversely, the first circuitry may activate the pull-up resistance of the first circuitry when the first mode configuration data indicates that the first terminal should be configured as reset output terminal, thereby setting the first reset terminal to low during the reset and configuration phases and then to high.

In various embodiments, the second terminal control circuitry may be configured to activate the first (weak) pull-up resistance of the second circuitry or the second (strong) pull-up resistance of the second circuitry when the second mode configuration data indicates that the second terminal should be configured as reset output terminal. For example, the second circuitry may be configured, when the second mode configuration data indicates that the second terminal should be configured as reset output terminal, to activate the first pull-up resistance of the second circuitry or the second pull-up resistance of the second circuitry as a function of the second mode configuration data.

In various embodiments, the second circuitry may be configured to maintain activated the first (weak) pull-down resistance of the second circuitry when the second mode configuration data indicates that the second terminal should be configured as reset input terminal.

Moreover, in various embodiments, the second circuitry may be configured to configure the second reset terminal as General-Purpose I/O, when the second mode configuration data indicate that the second terminal should be configured as a General-Purpose I/O. Specifically, in this case, the second terminal control circuitry is connected to a processing core or a resource/peripheral of the processing system.

As mentioned before, the reset management circuit may use a first reset request signal generating a destructive reset and optionally a second reset request signal generating a functional reset. For example, in various embodiments, the first external reset signal received via the first reset terminal, i.e., the first binary signal, may be a first reset request signal. Conversely, the second external reset signal received via the second reset terminal, i.e., the second binary signal, may be a first reset request signal or a second reset request signal as a function of third second mode configuration data. For example, for this purpose, the reset management circuit may have at least one configuration data client associated therewith, and the configuration data may comprise the third mode configuration data for the reset management circuit, which as thus distributed during the configuration phase.

BRIEF DESCRIPTION OF THE DRAWINGS

Embodiments of the present disclosure will now be described with reference to the annexed drawings, which are provided purely by way of non-limiting example and in which:

FIGS. 2 and 3 show examples of prior art processing systems;

FIG. 4 shows an embodiment of a processing system according to the present disclosure;

DETAILED DESCRIPTION

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" indicates that a particular feature, structure, or characteristic described in connection with the embodiment is included in at least one embodiment.

Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
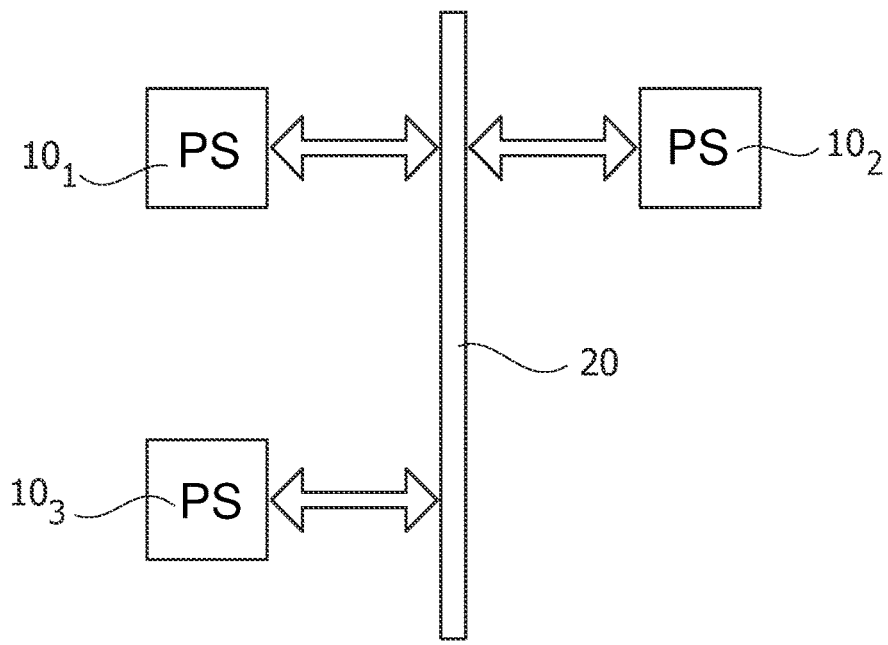
FIG. 1 shows an example of a prior art electronic system comprising a plurality of processing systems.
Figure 2:
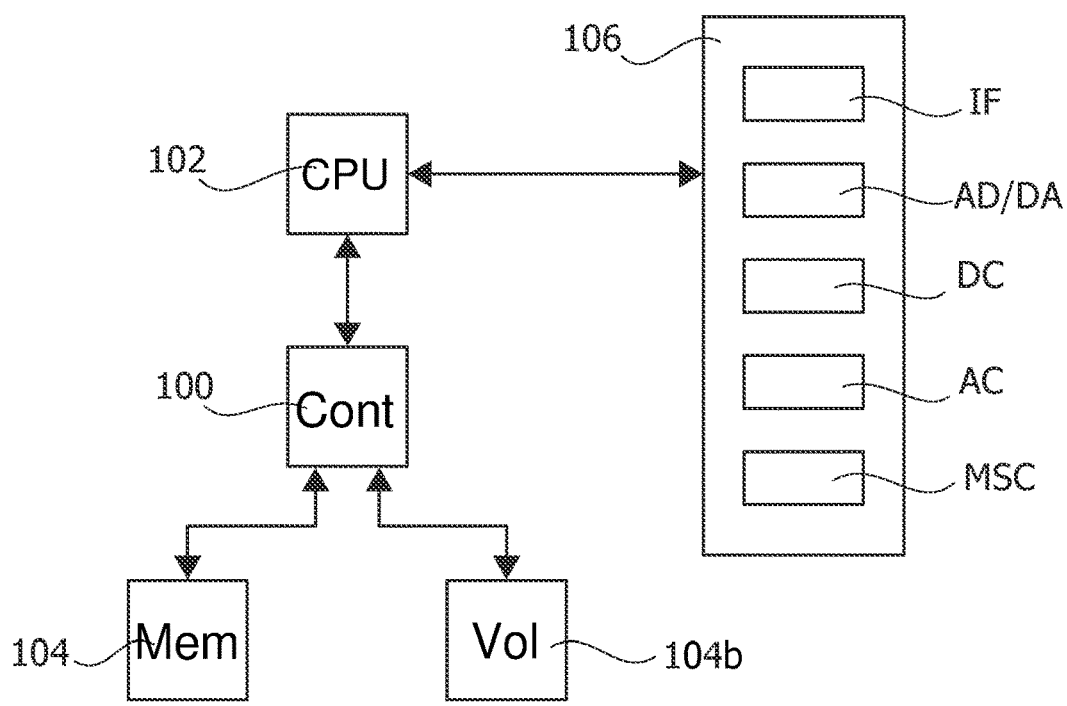

In the following FIGS. 4 to 18 parts, elements or components which have already been described with reference to FIGS. 1 to 3 are denoted by the same references previously used in such Figure; the description of such previously described elements will not be repeated in the following in order not to overburden the present detailed description.

As described in the foregoing, the integrated circuit of a processing system may comprise a plurality of terminals, i.e., pads in case of an integrated circuits die (e.g., mounted directly on a printed circuit board), or pins or balls of packaged integrated circuit (based on the type of the packaged). For the sake of simplicity, in the following the term "pin" will mainly be used, regardless of whether the respective terminal is a pad, pin or ball.

The whole set of pins of an integrated circuit may be divided into three main functional groups: power supply terminals, including the ground terminal; system terminals, e.g., clock, reset, and/or configuration terminals; and general purpose I/O (GPIO) terminals.

The number of General Purpose I/O terminals may be as high as possible, because these are the pins where the customer can map the various functionalities of the processing system, such as: a register of a register interface of a processing core 102, whereby the processing core 102 may read or write the logic level at the pin; and one or more of the peripherals/resources 106, e.g., the data lines of a CAN interface, ADC input channels, etc.

For example, such a mapping may be implemented with some kind of switching circuit, such as: simple electronic switches, which determine whether a given terminal is an I/O terminal (and thus connected to the register interface of a processing core I/O) or connected to a given resource 106, or a set of multiplexers, which permits to route each resource selectively to one or more pins.

Typically, the number of pins of an integrated circuit is limited, which especially applies for small packages. Thus, in order to increase the number of GPIO pins, the number of other pins may be reduced, i.e., the number of supply and system pins may be reduced.

Generally, the number of power supply pins is determined by the power supply constraints of the processing system, such as the number of different supply voltages the processing system uses, the maximum power consumption of the processing system, etc. These constraints translate into a minimum number of power supply pins requested by the designers, which usually cannot be reduced.

For what concerns the system pins, some of them may be needed in order to accomplish mandatory features, such as pins dedicated to the input or output of clock signals, pins used to enable certain test-modes, etc. The number of these pins may already be minimized at the time of design.

However, a different situation may exist for the reset pins. Specifically, as described in the foregoing, modern processing systems implemented in an integrated circuit often use one or more reset pins. Such reset pins may be used for two functionalities: as input, i.e., in order to receive a signal indicative of a reset event, wherein the signal is set externally with respect to the integrated circuit; or as output, i.e., in order to provide a signal indicative of an internal reset status of the processing system.

Thus, in order to reduce the number of reset pins, such dedicated input and output terminals may be combined in a single bidirectional pin. However, such bidirectional pins are not always suitable. For example, different applications may have different needs in terms of which reset pins shall be used and which characteristics they shall have. For example, different customers may have different reset pin schemes, such as: a single reset pin, which is input and unidirectional; separated input and output reset pins; a single reset pin, which is bidirectional (i.e., it serves both as a reset input and as a reset output); a plurality of input reset pins, each of them corresponding to a different reset event, which may be handled different by the reset management circuit; and an additional third reset pin, which is controlled (input) or monitored (output) by an external circuit, such as a debugger.

On top of the listed scenarios, additional constraints may exist, e.g., because the external circuit that manages the reset pins might have different requirements in terms of the maximum current that can flow though the reset pin connection. Moreover, additional reset pin differences exist because different testing tools have different needs toward the reset pin control (e.g., the possibility to reset only the processing core(s) without losing the debug connection). Finally, the output reset pin might also be used to reset external logic, for example, an external non-volatile memory component, which might have different needs, for example in terms of reset voltage.

Therefore, for a system designed to serve different applications, it would be useful to have configurable reset pins. Accordingly, the present disclosure describes approaches for the configuration and functionality of the reset pins. For example, various embodiments of the present disclosure permit reaching a high number of application configurations and scenarios, fitting multiple customer use cases, with a plurality of configurable reset pins, such as two configurable reset pins.

FIG. 4 shows an embodiment of a processing system 10a according to the present description.

In the embodiment considered, the underlying architecture of the processing system 10a corresponds to the processing system described with respect to FIGS. 2 and 3, and the respective description applies in their entirety. Thus, also in this case, the processing system 10a, such as an integrated circuit, comprises: at least one processing core 102; a memory controller 100 configured to be connected to a (internal or external) non-volatile memory 104; at least one resource 106; a communication system 114 connecting the processing core(s) 102, the memory controller 100 and the resource(s) 106; and a reset management circuit (RMC) 116a.

As mentioned before, in various embodiments, the behavior of the reset management circuit 116a and/or the respective reset pins is configurable.

In general, similar as other resource 106, the reset management circuit 116a could be configured by providing a register interface, which is programmable via software instructions executed by a processing core 102. However, such an approach is not feasible, e.g., because the processing core(s) 102 are not running yet when the first reset is executed, i.e., the power-on reset. Moreover, in response to a reset, the processing core(s) 102 are usually also reset.

Accordingly, in various embodiments, separate configuration data CD are used to configure the reset management circuit 116a and the reset pins. Specifically, these configuration data CD are read and distributed via a dedicated hardware configuration circuit 108.

For example, in line with the description of United States Patent Application Publication No. 2020/0348890 (European Patent Number 3,413,194A1), the content of which is incorporated by reference, the configuration data CD may be written into specific areas of the non-volatile memory 104 and retrieved when the processing system 10*a* is powered on. The non-volatile memory 104 is integrated in the integrated circuit and may also be used to store the firmware of the processing core(s) 102. However, the firmware may also be stored in a separate non-volatile memory 104. For example, the non-volatile program memory may be used, in case the program memory is integrated in the integrated circuit. Conversely, an additional (small) internal non-volatile memory 104 may be used in case the program memory is an external memory. Accordingly, in various embodiments, the configuration data CD are stored in a non-volatile memory of the integrated circuit comprising the blocks requiring configuration data, such as the processing unit 102 and/or one or more of the hardware resources 106, and in particular the reset management circuit 116*a*.

For example, the configuration data CD may comprise calibration data used to guarantee that the hardware behavior is uniform, thereby compensating possible production process tolerances. For example, this applies often to the calibration of analog components of the processing system, such as a temperature sensor, analog-to-digital converter, voltage reference, etc.

Moreover, the configuration data CD may also be used to customize the behavior of the hardware, in particular the reset management circuit 116*a* and optionally one or more of the resources 106. As will be described in greater detail in the following, in general, a first part of the configuration data CD may be written by the producer of the hardware of the processing system (e.g., the producer of an integrated circuit), and/or a second part of the configuration data CD may be written by the developer of the firmware of the processing system 10*a*.

As mentioned before, the programmed configuration data CD may be read during a reset stage, which usually starts as soon as the processing system 10*a* is powered on.

Specifically, as shown in FIG. 4, the processing system 10*a* may comprise for this purpose a hardware configuration module (HCM) 108 configured to read the configuration data CD from the non-volatile memory 104 and distribute these data within the processing system 10*a*.

In various embodiments, the hardware configuration module 108 may be configured to read the configuration data CD from the non-volatile memory 104 by sending read requests to the memory controller 100 via the communication system 114. Additionally or alternatively, the hardware configuration module 108 may also be connected directly to the memory controller 100 or be configured to directly read the data from the memory 104.

Similarly, the hardware configuration module 108 may be configured to send the configuration data CD to the various circuits by sending write requests via the communication system 114. However, the hardware configuration module 108 may also use a separate communication channel for the configuration data CD.

Figure 5:
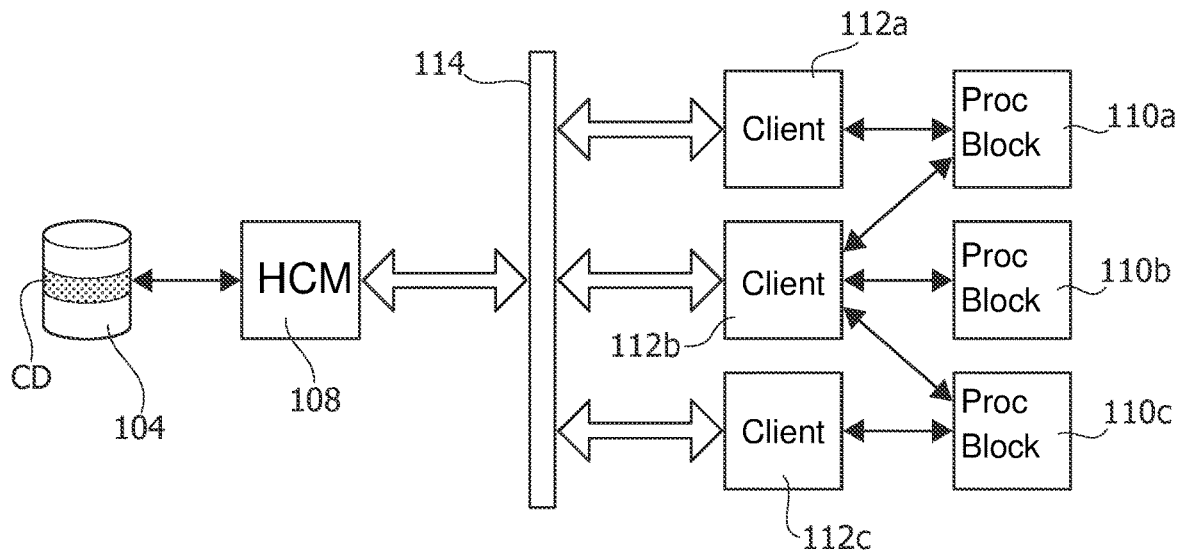
FIGS. 5 and 6 show embodiments for distributing configuration data in the processing system of FIG. 4.

For example, FIG. 5 shows a possible embodiment of the hardware configuration module 108. For example, in the embodiment considered, the configuration data CD are stored in reserved memory areas, e.g., in the form of a plurality of consecutive memory locations.

Accordingly, in the embodiment considered, the configuration module 108 accesses the reserved memory areas containing the configuration data CD, reads the configuration data CD and transmits the configuration data CD to a respective block 110 within the processing system 10*a*. Generally, the block 110 may correspond to any block of the processing system 10*a* requiring configuration data and may correspond to the processing unit 102, a hardware resource 106, the reset management circuit 116*a* or even a memory 104 and/or 104*b*.

For example, in order to distribute the configuration data CD, each block 110 may have a respective configuration data client 112 associated therewith. For example, shown in FIG. 5 are three blocks 110*a*, 110*b* and 110*c* and three configuration data clients 112*a*, 112*b* and 112*c*. Generally, each configuration data client 112 may be associated to a single hardware block 110 and provide configuration data to the associated hardware block 110, e.g., a specific hardware resource 106, or may be associated with a plurality of hardware blocks 110, e.g., a plurality of hardware resource 106. In general, the configuration data clients 112*a*, 112*b* and 112*c* may also be integrated in the respective block 110*a*, 110*b* and 110*c*.

Accordingly, in the embodiment considered, the configuration module 108 may determine for each target block 110 to be configured with the respective configuration data (selected from the configuration data CD) and transmit the configuration data associated with the target block 110 to the configuration data client 112 associated with the target block 110. Similarly, while reading the configuration data CD from the memory 104, the configuration module 108 may determine the target block(s) for the current configuration information and send the current configuration data to the configuration data client(s) associated with the respective target block(s). Generally, any communication may be used for transmitting the configuration data to the configuration data client 112, including both serial and parallel communications. For example, the configuration module 108 and the configuration data clients 112 may be connected via the communication system 114 or an additional bus, and each configuration data client 112 may have associated a respective target address.

Accordingly, each configuration data client 112 is configured to receive the configuration data from the module 108, store them into the internal register, e.g., store them into one or more internal flip-flops or latches. The data stored in the register may then be used to generate one or more signals, which influence the behavior of one or more hardware blocks 110.

Figure 6:
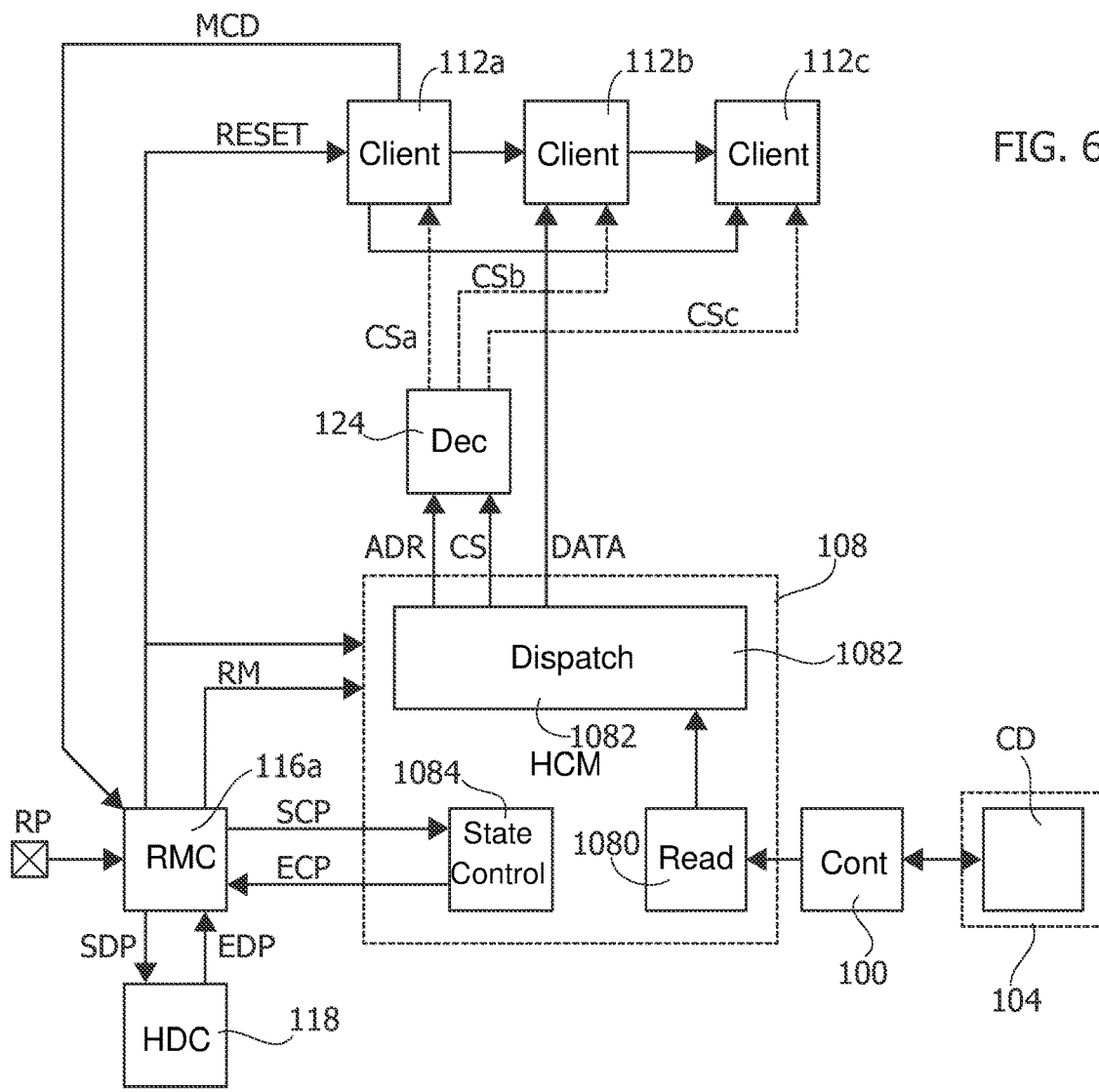

FIG. 6 shows in this respect a possible embodiment of the communication between the configuration module 108 and the configuration data clients 112.

Specifically, also in this case, the processing system 10*a* comprises a configuration module 108 configured to read the configuration data CD from one or more non-volatile memories 104 and a plurality of configuration data clients 112 configured to receive respective configuration data from the module 108 and distribute them among a plurality of blocks 110 (not shown) requiring configuration data. For example, as mentioned before, each configuration data client 112 may be associated with a respective circuit 110. For example, in the embodiment considered, the processing system 10*a* comprises again three configuration data clients 112*a*, 112*b* and 112*c*.

In the embodiment considered, the configuration module 108 comprises a data read module 1080 configured to read the configuration data CD from the memory 104 and a dispatch module 1082 configured to transmit the configuration data to the configuration data clients 112.

For example, in various embodiments, the communication between the dispatch module 1082 and the configuration data clients 112 is based on data frames in accordance with a given format, called in the following Device Configuration Format (DCF). For example, in various embodiments, each data frame comprises two fields: the payload (i.e., the real data), called DCF Format payload, and possible additional data attributes used to identify the receiver of the data, called DCF Format attributes, wherein the receiver is one of the configuration data clients 112 representing a DCF client. For example, the data attributes may be 16 or 32 bits, wherein a given number of bits specifies the address of one of the configuration data clients 112, and the payload may be 16 or 32 bits. For example, in various embodiments, the data read module 1080 is configured to read blocks of 64 bits from the memory 104, wherein the first 32 bits contain the data attributes (including the address of a configuration data client) and the second 32 bits contain the configuration data to be transmitted to the address specified in the data attributes. As mentioned before, the address may correspond to a physical address of the communication system 114 or of a separate communication bus.

In various embodiments, the module 108 may also comprises a state control module 1084 configured to manage the various configuration phases of the processing system 10*a*.

For example, in various embodiments, once the processing system 10*a* is switched-on, a reset module 116*a* of the processing system 10*a* may generate a reset signal RESET, which is used to perform a reset of the various components of the processing system 10*a*. For example, the reset signal RESET may correspond to a reset pulse of a given number of clock cycles, provided to the blocks 110 of the processing system 10*a*. For example, in the embodiment considered, the reset signal RESET may be used by the configuration data clients 112 in order to set the internal register to a given reset value.

Similarly, in response to a reset, the reset circuit 116*a* may activate the state control module 1084, thereby activating the configuration phase. Specifically, during the configuration phase, the data read module 1080 may read the configuration data CD from the memory 104 and the dispatch module 1082 may send the configuration data CD to the various configuration data clients 112, thereby overwriting the reset values.

For example, in various embodiments, the dispatch module 1082 may generate a data signal DATA having a given number of bits (corresponding to the bits of the payload) containing the configuration data to be transmitted to a given configuration data client 112 and further control signals for selecting the target configuration data client 112. For example, in the embodiment considered, the dispatch module 1082 also generates an address signal ADR containing the address of the target configuration data client 112 and optionally a chip select signal CS used to signal that the address signal ADR and the data signal DATA are valid.

For example, in various embodiments, the address signal ADR (and the chip select signal CS) may be provided to a decoder (Dec) 124 configured to activate one of the configuration data clients 112 as a function of the address signal ADD. For example, in the embodiment considered, the decoder 124 may set a chip select signal CSa in order to indicate that the configuration data client 112*a* should read the data signal DATA when the address signal ADR corresponds to an address assigned to the configuration data client 112*a* (and the chip select signal CS is set). Similarly, the decoder 124 may set a chip select signal CSb in order to indicate that the configuration data client 112*b* should read the data signal DATA when the address signal ADR corresponds to an address assigned to the configuration data client 112*b* (and the chip select signal CS is set), etc.

Accordingly, as mentioned before, the configuration data CD may also comprise the configuration data for the reset management circuit 116*a* and the reset pins, indicated in the following as mode configuration data MCD. For example, in FIG. 6, the configuration data client 112*a* is associated with the reset management circuit 116*a*, i.e., the configuration data client 112*a* stores the mode configuration data MCD of the reset circuit 116*a*. As mentioned before, the reset circuit 116*a* could also receive the configuration data from further configuration data clients 112 and/or the configuration data client 112*a* may provide the stored configuration data also to other circuits 110. Accordingly, in various embodiments, the mode configuration data MCD may be stored in the non-volatile memory 104 in the form of one or more DCF data packets comprising, in the address field, the address of a configuration data client 112 associated with the reset circuit 116*a*, e.g., the address of the configuration data client 112*a*, and in the payload field, the respective mode configuration data MCD or portion of mode configuration data MCD.

Generally, as mentioned in the foregoing the configuration data CD may comprise two sub-sets of configuration data: a first group of configuration data (e.g., a first subset of the mode configuration data MCD) written by the producer of the processing system 10*a*, e.g., the chip manufacture; and a second group of configuration data (e.g., a second subset of the mode configuration data MCD) written during a later stage, such as configuration data written by the firmware developer and/or a system integrator, such as the producer of an Engine Control Unit.

In various embodiments, these groups of configuration data are written to different areas of the memory(ies) 104, thereby permitting that these groups may be configured independently, or the second group of configuration data may be appended to the first group of configuration data.

For example, as will be described in greater detail in the following, in this way the first subset of the mode configuration data MCD could specify whether a given pin is used as reset pin or GPIO pin, while the second subset of the mode configuration data MCD could specify the properties of the reset pin.

Accordingly, in various embodiments, the hardware configuration circuit 108 is configured to read (via a suitable communication channel) the configuration data CD from the non-volatile memory 104 and transmit the configuration data CD to the various circuits 110, e.g., the processing core(s) 102, the memory controller 100 and the resources 106.

Specifically, based on the control implemented in the state control circuit 1084, e.g., in the form of a sequential logic circuit implementing a state machine, the hardware configuration circuit reads the configuration data CD after a reset, but before the processing core(s) 102 are activated.

As disclosed in U.S. Pat. No. 11,068,255 (European Patent Application Number 3,719,636A1), the contents of which are incorporated by reference, indeed two types of resets may be used in conventional processing systems. The first reset corresponds to a "simple" reset as described essentially in the foregoing, where some kind of reset event activates the internal reset stage 116*a* in order to perform a reset of the processing system. The second type of reset corresponds to a complex reset wherein the reset is split into a plurality of phases.

Figure 7:
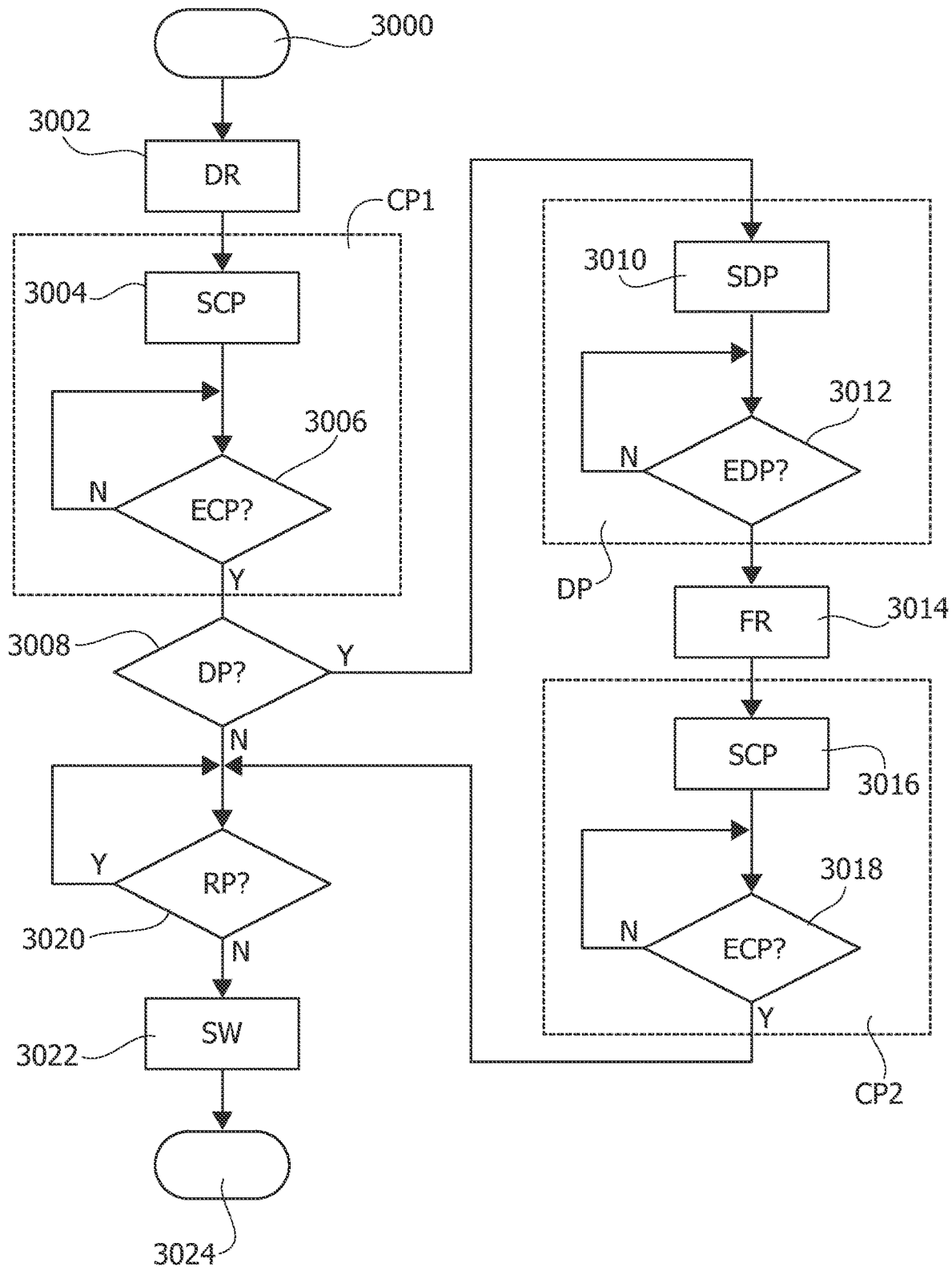
FIG. 7 is a flowchart showing an embodiment of the operation of the processing system of FIG. 6.

FIG. 7 schematically shows an embodiment of the operation of the reset circuit 116a.

At a step 3000 the reset is activated, and a reset (destructive reset—DR) is performed at a step 3002. For example, the reset module 116a may set the signal RESET at the step 3002. Accordingly, in response to the reset requested at the step 3002, the various latches/registers of the processing system 10a are reset (e.g., the content of the configuration data clients 112 and the configuration module 108).

Next, the reset module 116a starts at a step 3004 the configuration phase, e.g., by setting a signal SCP, which is provided to the state control module 1084. In response to the signal SCP, the configuration circuit 108 reads and distributes the configuration data CD. Generally, the signal SCP is purely optionally because the configuration phase could be started automatically when the reset signal RESET is de-asserted.

At the end of the configuration phase, the configuration circuit 108 may set a signal ECP in order to indicate that the configuration phase is completed.

Accordingly, as shown in FIG. 7, the reset circuit 116a may proceed from the step 3004 to a verification step 3006, where the reset module 116a waits until the signal ECP is set by the configuration circuit 108 (output "N" of the verification step 3006). Once the signal ECP is set (output "Y" of the verification step 3006), the processing system 10a is configured. Accordingly, the steps 3004 and 3006 implement a configuration phase CP1 of the processing system 10a.

Accordingly, in general, after the verification step 3006, the processing core(s) 102 may be started (SW) at a step 3022 and the reset procedure may terminate at a step 3024. Accordingly, at the step 3022 is started a software runtime phase SW.

Substantially, the reset phase 3002 and the configuration phase CP1 implement a reset stage, where the various circuits of the processing system are reset and then the configuration data CD are distributed, thereby storing given values to the registers of the processing system 10a prior to starting the processing core(s) 102.

However, as shown in FIG. 7, the processing system 10a may also be configured to run a diagnostic phase DP where the processing system 10a executes one or more additional system diagnostic operations, i.e., the processing system 10a executes a Built-In Self-Test (BIST). For example, in the embodiment shown in FIG. 6, the processing system 10a comprise a hardware diagnostic circuit (HDC) 118, which is activated via a signal SDP.

Accordingly, in various embodiments, once the signal ECP is set (output "Y" of the verification step 3006), the reset circuit 116a may set the signal SDP at a step 3010, thereby starting the diagnostic circuit 118. Next, the reset module 116a may wait at a step 3012 until the diagnostic operations have been executed, i.e., the self-test has been completed. For example, as shown in FIG. 6, the diagnostic circuit 118 may set a signal EDP once the diagnostic operations have been executed.

Accordingly, as shown in FIG. 7, the reset circuit 116a may proceed from the step 3010 to a verification step 3012, where the reset module 116a waits until the signal EDP is set by the diagnostic circuit 118 (output "N" of the verification step 3012). Once the signal EDP is set (output "Y" of the verification step 3012), the diagnostic phase DP (steps 3010 and 3012) has been completed.

In various embodiments, the self-test operations executed by the diagnostic circuit 118 may test one or more registers of the processing system 10a, which usually involves write and/or read operations, thereby modifying the content of such registers.

Accordingly, in various embodiments, once having executed the diagnostic phase DP, the reset module 116a may execute a further reset (FR) of the processing system 10a at a step 3014. For example, the reset circuit 116a may set again the signal RESET at the step 3014.

Generally, the reset executed at the step 3002, representing a first reset, and the reset executed at the step 3016, representing a second reset, may be different, e.g., with respect to the registers and/or circuits which are reset by the reset circuit 116a. For example, this is schematically shown in FIG. 6, where the reset circuit 116a also generates a reset mode signal RM, which is set to a first logic level at the step 3002 and a second logic level at the step 3014. However, the reset circuit could also set a first reset signal RESET1 at the step 3002 (used to reset a first sub-set of circuits) and a second reset signal RESET2 at the step 3014 (used to reset a second sub-set of circuits).

In various embodiments, the diagnostic circuit 118 may also test the registers of one or more of the configuration data clients 112. Accordingly, in this case, it is also useful to read again the configuration data CD at a second configuration phase CP2.

Accordingly, in various embodiments, the reset module 116a may proceed from the step 3014 to a step 3016, where the reset circuit 116a starts again a configuration phase, e.g., by setting a signal SCP, which is provided to the state control module 1084. In response to the signal SCP, the configuration circuit 108 reads and distributes the configuration data CD. At the end of the configuration phase, the configuration circuit 108 sets again the signal ECP in order to indicate that the configuration phase is completed.

Accordingly, the reset circuit 116a may proceed from the step 3016 to a verification step 3018, where the reset module 116a waits until the signal ECP is set by the configuration circuit 108 (output "N" of the verification step 3018). Once the signal ECP is set (output "Y" of the verification step 3018), the processing circuit may thus proceed to the step 3022 for starting the processing core(s) 102.

Substantially, the reset phase 3014 and the configuration phase CP2 implement a further reset stage, where the various circuits of the processing system are again reset and then the configuration data CD are distributed.

As mentioned before, the reset circuit 116a may be configured to optionally start the diagnostic phase DP after the configuration phase CP1. This configuration may be hardwired or programmable. Specifically, as mentioned before, the configuration data CD are already distributed at the end of the configuration phase CP1. Accordingly, the configuration data CD may also include data which indicate whether the self-test function should be activated or not, possibly also including data specifying which self-test should be executed. For example, these data may be provided to the reset circuit 116a and/or diagnostic circuit by associating respective configuration data clients with these circuits.

According, at the end of the step 3006, the reset circuit 116a may indeed proceed to a verification step 3008. Specifically, when the execution of the diagnostic phase DP is enabled (output "Y" of the verification step 3008), the reset module 116a proceeds to the step 3010. Conversely, when the execution of the self-test is disabled (output "N" of the verification step 3008), the procedure may directly proceed to the step 3022 in order to start the normal-operation mode of the processing system.

Thus, essentially, a simple reset implements a single reset (step 3002) and the configuration phase CP1. Conversely, a complex reset also implements the diagnostic phase DP, the further reset 3014 and optionally the further configuration phase CP2. Generally, as mentioned before, the processing system 10*a* may also support both types of resets, wherein a complex reset is executed in response to a first set of events and a simple reset is executed in response to a second set of events (e.g., verified at the step 3008). For example, a complex reset may be executed in response to a start-up of the processing system 10*a* or in response to given (critical) errors, while a simple reset may be executed in response to a reset request by the processing unit 102. Generally, the reset events may be static/hardwired or may be configurable.

Typically, the first reset at the step 3002 is called "destructive reset" DR, because usually the registers of the processing system 10*a* are reset to a reset value, while the second reset at the step 3014 is usually identified as a functional reset FR, because not necessarily all registers of the processing system are reset, such as registers of one or more of the resources 106. For example, the registers of the reset module 116*a* cannot be reset at the step 3016, because otherwise the reset module would lose the information whether already a first reset at the step 3002 had been performed. Generally, in case the BIST does not test the registers of the configuration data clients 112, the functional reset at the step 3014 may also be a so called "Short Functional Reset", where the processing system 10*a* is reset but the configuration circuit 108 does not read again the configuration data CD, i.e., the configuration phase CP2 may be omitted.

In this respect, given events (such as a power-on of the processing system 10*a*) may trigger the complex reset procedure shown in FIG. 7 (starting at a destructive reset 3002), while other events (e.g., a reset requested by a resource 106) may trigger only a functional reset, i.e., start immediately the step 3014. Moreover, further events (e.g., a reset requested by a processing unit 102) may trigger only a short functional reset. Typically, the reset triggers are classified as functional, short functional or destructive at design time, and/or may be configured via configuration data CD. Similarly, as mentioned before, the execution of the BIST may be set at design time, and/or may be configured via configuration data CD, possibly for each trigger associated with a destructive reset.

Accordingly, in various embodiments, when executing a complex or simple reset, i.e., between the steps 3002 and 3020, the processing core(s) 102 are not running, i.e., the processing core(s) 102 do not execute any software. For example, this may be obtained by keeping the processing core(s) 102 under reset. Conversely, other circuits of the processing system 10*a* may be operative, e.g., the reset circuit 116*a*, the diagnostic circuit 118, the hardware configuration circuit 108, the non-volatile memory 104, one or more of the resources 106, etc. In fact, at least the circuits 104, 108 and 116*a* are used to manage the reset phase, including the configuration phase(s) and diagnostic phase, of the processing system 10*a*, and thus ensure that the configuration data CD are available once the processing core(s) 102 are activated at the step 3022. In this respect, the reset circuit 116*a* and/or the state control module 1084 may also implement further steps, such as an initialization phase, where the reset circuit 116*a* and/or the state control module 1084, e.g., wait that the non-volatile memory 104 completes its initialization, thereby ensuring that the data read circuit 1080 may read the configuration data CD from the non-volatile memory 104.

As described in the foregoing, in various embodiments, the reset circuit 116*a* is configured to reset the processing system 10*a* in response to a signal received via a reset pin RP of the processing system 10*a*. For example, this is schematically shown in FIG. 6. In this case, the reset circuit 116*a* may be configured to verify at a step 3020 (before proceeding to the step 3022), whether the signal applied to the reset terminal RP is asserted/has a first logic level, e.g., is low. For example, in this case, the processing system 10*a* may be configured to start a complex reset at the step 3000 when the signal applied to the reset terminal RP has a first logic value. Next the reset circuit executes the steps 3002 to 3018, and the processing system 10*a* remains at the step 3020 while the signal applied to the reset terminal RP is asserted/has the first logic level (output "Y" of the verification step 3020), i.e., the processing system 10*a* proceeds from the step 3020 to the step 3022 (output "N" of the verification step 3020) when the logic level of the signal applied to the reset terminal RP is de-asserted/has a second logic level, e.g., high. Accordingly, in the embodiment considered, the processing core(s) are only started at the step 3022 when the signal applied to the reset terminal RP is de-asserted/has the second logic level.

Generally, while FIG. 7 shows an embodiment, where the various reset phases are managed by the reset circuit 116*a*, these phases could also be managed by the state control circuit 1084 or another state machine. Thus, in general the operation shown in FIG. 7 may be implemented in any suitable manner by the processing system 10*a*.

Accordingly, in various embodiments, the processing system 10*a*, e.g., via the reset management circuit 116*a* is configured to manage, in response to a destructive reset request (step 3000), three main phases: reset stage R1: execution of the destructive reset DR at the step 3002 and the configuration phase CP1; reset stage R3: starting the software execution of the processing core(s) 102 at the step 3022; and reset stage R2: optional intermediate operations between the reset phase R1 and the reset phase R3, such as the optional steps DP, 3014, CP2 and/or 3020.

As mentioned before, such a destructive reset may be requested, e.g., in response to starting the processing system (power-on event as detected by the circuit 115), possible other internal reset events IR, and/or by setting a reset pin to a given logic level. However, this implies that the configuration data CD, and in particular the mode configuration data MCD, may not have been read yet when a destructive reset is requested. Accordingly, the inventor has observed, that the processing system 10*a*, in particular the reset management circuit 116*a* and the reset pins have to be configured in a specific manner in order to permit the management of configurable reset pins.

Figure 8:
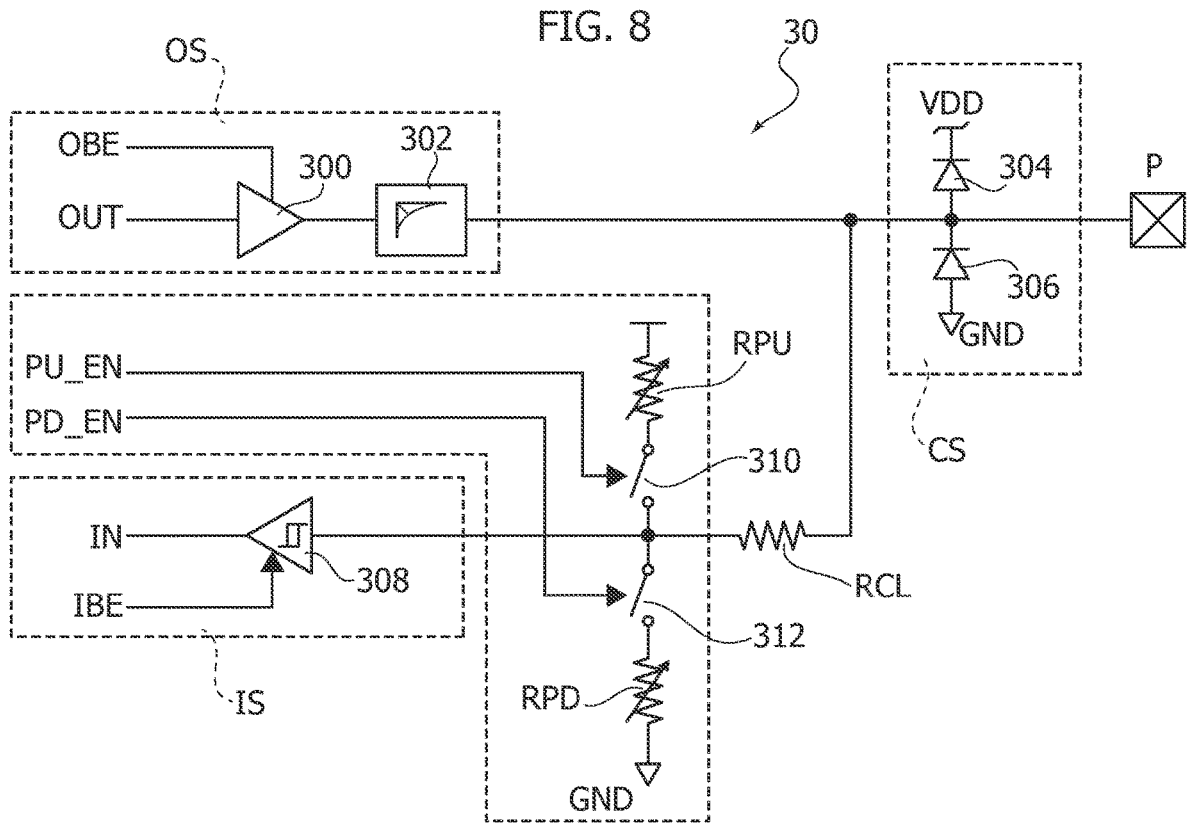
FIG. 8 shows an embodiment of the input/output circuit of a terminal of the processing system of FIG. 4.

FIG. 8 shows in this respect a possible embodiment of the pin/pad circuitry 30 of a General Purpose I/O pin P.

In the embodiment considered, the circuitry 30 is supplied by a voltage VDD and comprises an output stage OS. In various embodiments, the output stage OS may comprise a tristate driver/buffer circuit 300 configured to: connect the pin P to the supply voltage VDD; connect the pin P to ground GND; or disconnect the output of the driver circuit 300 from the pin P, whereby the pin P maintains its voltage level.

For example, as shown in FIG. 8, the driver circuit 300 may receive a binary output data signal OUT and an output-enable signal OBE. In this case, the driver circuit 300 may be configured to: when the output-enable signal OBE has a first logic level (e.g., low), disconnect the output of the driver circuit 300 from the pin P; and when the output-enable signal OBE has a second logic level (e.g., high), connect the output of the driver circuit 300 either to the supply voltage VDD or ground GND as a function of the output data signal OUT.

In various embodiments, the output stage OS may also comprise a filter circuit 302, such as a low-pass filter, connected between the output of the driver circuit 300 and the pin P.

In the embodiment considered, the circuitry 30 also comprises an input stage IS. Specifically, the input stage is configured to set the logic level of a binary input data signal IN as a function of the voltage at the pin P. For example, for this purpose the input stage IS may comprise a comparator or preferably a Schmitt trigger 308 configured to set the value of the signal IN by comparing the voltage at the pin P with at least one threshold value. Optionally, the comparator or Schmitt trigger 308 may be configured to be selectively enabled as a function of an input-enabled signal IBE. Typically, the threshold value is determined as a function of the supply voltage VDD.

In various embodiments, the processing system 10 may also use a plurality of supply voltages, and the supply voltage VDD of the circuitry 30 may be selected amongst these supply voltages, e.g., as a function of: the content of a register being programmable by a processing core 102; and/or the previous mentioned configuration data CD.

For example, in this way the voltage level to be applied to the pin P in case the signals OBE and OUT are set to high may be set. Similarly, the selection of the supply voltage VDD may be used to set the threshold of the input stage IS, thereby setting the threshold for the voltage at the pin P at which the signal IN is set to high.

In various embodiments, the circuitry 30 also comprises a clamping stage CS. For example, such a clamping stage CS may comprise: a first diode 304, wherein the anode of the diode 304 is connected to the pin P and the cathode of the diode 304 is connected to the supply voltage VDD; and a second diode 306, wherein the anode of the diode 304 is connected to ground GND and the cathode of the diode 304 is connected to the pin P.

Generally, the circuitry 30 may also comprise other components for limiting current flows or voltage levels in the circuitry 30. For example, in FIG. 8 a current limiting resistor RCL is also shown between the pin P and the input of the input stage IS.

In various embodiments, the circuitry 30 may also comprise a pull-up resistor RPU and/or a pull-down resistor RPD. Specifically, in various embodiments, the pull-up resistor RPU and/or the pull-down resistor RPD may be selectively enabled as a function of a signal PU_EN and a signal PD_EN, respectively. For example, for this purpose, the circuit 30 may comprise: a pull-up resistor RPU and an electronic switch 310 connected in series between the supply voltage VDD and the pin P, wherein the electronic switch 310 is driven via the signal PU_EN; and a pull-down resistor RPD and an electronic switch 312 connected in series between the pin P and ground GND, wherein the electronic switch 312 is driven via the signal PD_EN.

In various embodiments, the resistance value of the pull-up and/or pull-down resistors may be configurable. For example, for this purpose: the resistor RPU and/or the resistor RPD may be variable resistors, wherein the resistance value may be set as a function of a control signal (not shown in FIG. 8); and/or the resistor RPU and/or the resistor RPD may be implemented with a plurality of resistors, wherein each resistor is connected via a respective electronic switch 310 or 312, respectively, to the pin P, wherein each electronic switch 310 or 312 is driven via a respective signal PU_EN or PD_EN.

Such pull-down and pull-up resistors may be used for various purposes in the context of reset pins.

For example, an input reset terminal (i.e., the output driver circuit 300 is disabled via the signal OBE) may be connected via a pull-down to ground GND. Accordingly, when an external voltage is applied to the reset terminal, this voltage will also impose the voltage at the input of the input stage IS (e.g., of the Schmitt trigger 308). However, when the pin is disconnected, the pull-down resistor RPD will set the voltage at the input of the input stage IS to a low level, i.e., the signal IN would be low. For example, in this way it may be avoided that a floating reset terminal generates undesired reset events. Moreover, as will be described in greater detail in the following, the processing system 10a may be kept under reset if the pad P is disconnected.

Conversely, in case of an output reset terminal, the pull-up or pull-down resistors may be used to set the output reset terminal to a "soft" logic level. For example, in this case the driver circuit 300 may be disabled (via the signal OBE) and the pin P may be set to low or high by activating the pull-down or pull-up resistor via the signal PD_EN or PU_EN, respectively.

Moreover, the pull-up or down resistors may be used in case of bidirectional reset terminals.

Generally, based on the application, the pull-up or pull-down resistance should be small (strong pull-up/down) or large (weak pull-up/down). Specifically, a strong pull-down is defined as a small resistance connected to ground GND. Due to the fact that the pin voltage level is determined by the equation V=RI, where R is small, the voltage of the pin is zero in the absence of a current flow and a high current flow brings the level of the signal IN to high. Vice versa, a weak pull-down provides a higher resistance value. Therefore, while the voltage of the pin is again zero in the absence of a current flow, a smaller current flow is sufficient in order to bring the level of the signal IN to high. Complementary considerations apply also to a pull-up resistance.

As described in the foregoing, a strong pull-up or pull-down has a lower resistance value and thus requires a higher current. Consequently, the change of the logic level of the signal IN will be faster, because the impedance (determined by the pad resistance and parasitic capacitance) is small.

Vice versa, a weak pull-up or pull-down has a higher resistance value and thus requires a smaller current. Consequently, the change of the pad logic level will be slower because the impedance (determined by the pad resistance and parasitic capacitance) is higher.

Figure 9:
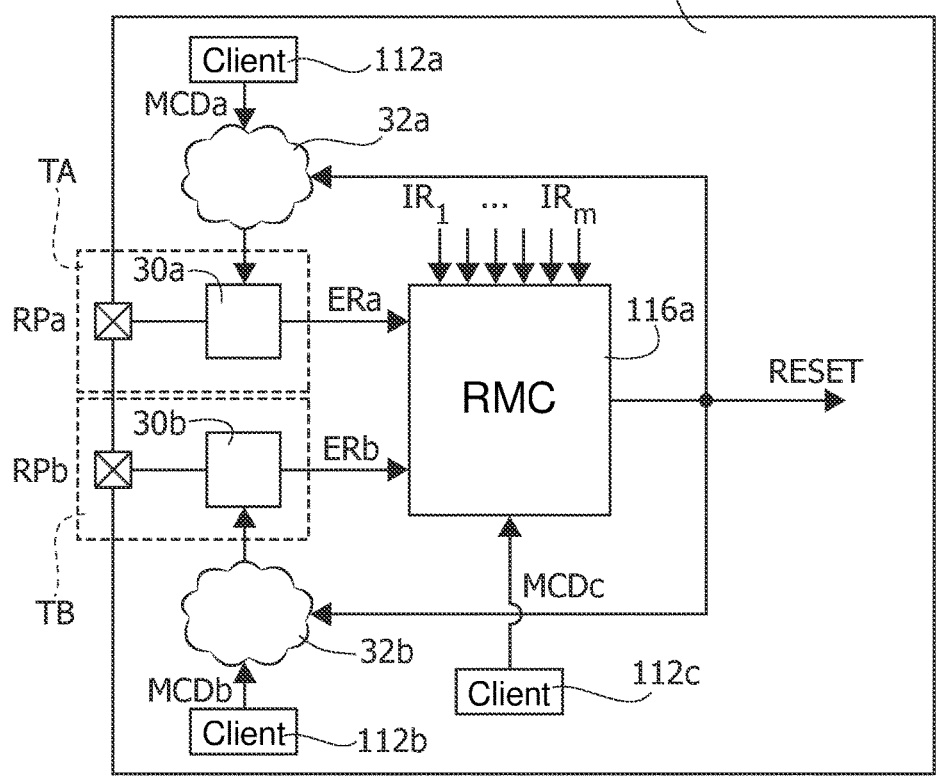
FIG. 9 shows an embodiment of a processing system disclosed herein comprising two reset terminals and a reset generator circuit.

FIG. 9 shows now an embodiment of a processing system 10a comprising a reset management circuit 116a and reset pins according to the present disclosure. Specifically, in FIG. 9, the processing system 10a comprises: at least one reset pad/pin RPa of a first type TA; at least one reset pad/pin RPb of a second type TB; and a reset management circuit 116a.

Specifically, as shown in FIG. 9, a reset pad/pin RPa is connected to a pad circuitry 30a (see the description of FIG. 8), wherein: the signal IN provided by the pad circuitry 30a is provided as an external reset signal ERa to the reset management circuit 116a; and the other signals received by the pad circuitry 30a are determined, e.g., via a combinational logic circuit 32a, as a function of mode configuration data stored MCDa stored to a configuration data client 112a and one or more signals provided by the reset circuit 116a, e.g., the reset signal RESET and optionally the reset mode signal RM, or the reset signals RESET1 (indicating a destructive reset) and RESET2 (indicating a functional reset).

Similarly, a reset pad/pin RPb is connected to a pad circuitry 30b (see again the description of FIG. 8), wherein: the signal IN provided by the pad circuitry 30b is provided as an external reset signal ERb to the reset management circuit 116a; and the other signals received by the pad circuitry 30b are determined, e.g., via a combinational logic circuit 32b, as a function of mode configuration data stored MCDb stored to a configuration data client 112b and one or more signals provided by the reset circuit 116a, e.g., the reset signal RESET and optionally the reset mode signal RM, or the reset signals RESET1 (indicating a destructive reset) and RESET2 (indicating a functional reset).

Accordingly, in the embodiment considered, the reset management circuit 116a is configured to generate one or more reset signals, e.g., the reset signal RESET and optionally the reset mode signal RM, or the reset signals RESET1 and RESET2, as a function of the reset signals ERa and ERb, and one or more internal reset signals $IR_1, \ldots, IR_m$.

As shown in FIG. 9, in various embodiments, the reset management circuit 116a may receive for this purpose mode configuration data MCDc from a configuration data client 112c. For example, in various embodiments, the mode configuration data MCDc may be used to specify for one or more of the reset signals $IR_1, \ldots, IR_m$, ERa or ERb: whether the respective reset signal is enabled or disable, and optionally the type of reset that should be generated, such as a destructive reset or a functional reset.

Generally, as will be described in greater detail the following, given events may also generate predetermined/ hardwired reset types. For example, a power-on event (as signaled, e.g., via the signal $IR_1$) and a reset event signaled via the signal ERa may generate a destructive reset, and a reset event signaled via the signal ERb may generate a programmable reset.

As described in the foregoing, the mode configuration data MCDa, MCDb and MCDc may be stored to the configuration data clients 112a, 112b and 112c via the configuration circuit 108, which is configured to read these data from the non-volatile memory 104. Specifically, as described in the foregoing, each configuration data client 112a, 112b and 112c may have a respective address associated therewith and the mode configuration data MCDa, MCDb and MCDc may be stored in the non-volatile memory 104 in the form of data packets comprising: the address of the respective configuration data client; and the respective mode configuration data.

In general, while FIG. 9 shows separate configuration data clients 112a, 112b and 112c, one or more of these configuration data clients may be combined, such as the configuration data clients 112a and 112b, and/or one or more of these configuration data clients may be implemented with a plurality of configuration data clients. For example, the configuration data clients 112a, 112b and 112c may indeed be implemented with the same configuration data client, wherein the mode configuration data MCDa are stored to a first subset of bits, the mode configuration data MCDb are stored to a second subset of bits and the mode configuration data MCDc are stored to a third subset of bits.

As described in the foregoing, in various embodiments, the processing system 10a comprises two types of reset pads. Specifically, in various embodiments: a reset pad RPa of type TA may be configured as a bidirectional (I/O) reset terminal, or a (unidirectional) reset output terminal; and a reset pad RPb of type TB may be configured as (unidirectional) reset input terminal, (unidirectional) reset output terminal, or as a General Purpose I/O terminal (i.e., the respective pin is connected to a processing core 102 or a peripheral/resource 106).

As mentioned before, the configuration of these reset pads RPa and RPb via the mode configuration data MCDa and MCDb and the configuration of the reset circuit 116a via the mode configuration data MCDc is based on the concept of DCF data packets. Moreover, the mode configuration data MCDa, MCDb and MCDc may be stored in the same configuration data client or in separate configuration data clients.

For example, in order to implement the above configuration of the reset pads RPa, the mode configuration data MCDa may comprise: a bit A_DIR, which is used to configure the reset pad as a bidirectional (I/O) reset terminal (e.g., A_DIR="0") or as a (unidirectional) reset output terminal (e.g., A_DIR="1").

Conversely, the mode configuration data MCDb may comprise: a bit B_GPIOEN, which is used to configure the reset pad RPb as reset terminal (e.g., B_GPIOEN="0") or GPIO (e.g., B_GPIOEN="1"); and a bit B_DIR bit, which is used to configure (in case the bit B_GPIOEN indicates that the pad RPB is a reset terminal) whether the reset pad RPb is a (unidirectional) reset input terminal (e.g., B_DIR="0") or a (unidirectional) reset output terminal (e.g., B_DIR="1").

In various embodiments, the mode configuration data MCDc may comprise: a bit B_DEST_FUNC, which is used to configure (in case the bit B_GPIOEN indicates that the pad RPB is a reset terminal and the bit B_DIR indicates that the pad RPB is a reset input terminal) whether the signal ERb provided by the reset pad RBb generates a destructive reset (e.g., B_DEST_FUNC="0") or a functional reset (e.g., B_DEST_FUNC="1").

In various embodiments and as will be described in greater detail in the following, in case the reset pad RPa and/or RBb is configured as output, the logic level at the pad may not be set via the signals OBE and OUT, but via the signals PU_EN and PD_EN, e.g.: in case the reset signal RESET is set to a first logic level (e.g., high), the signal PU_EN is used to connect the pad via the pull-up resistance RPU to the supply voltage VDD; and in case the reset signal RESET is set to a second logic level (e.g., low), the signal PD_EN is used to connect the pad via the pull-down resistance RPD to ground GND.

As described in the foregoing, in various embodiments, the "strength", i.e., the resistance value of the pull-up and/or pull-down resistances may be set to at least two different values: a first resistance value and a second resistance value, wherein the first resistance value is smaller than the second resistance value.

For example, in various embodiments, the mode configuration data MCDb may also comprise: a bit B_STR_UP, which is used to configure (in case the bit B_GPIOEN indicates that the pad RPb is a reset terminal and the bit B_DIR indicates that the pad RPb is a reset output terminal) the pull-up strength of the pad RPb; and a bit B_STR_DOWN, which is used to configure (in case the bit B_GPIOEN indicates that the pad RPb is a reset terminal and the bit B_DIR indicates that the pad RPb is a reset output terminal) the pull-down strength of the pad RPb.

For example, in various embodiments, the pull-up resistance may be implemented with two pull-up resistors $RPU_1$ and $RPU_2$, wherein a first electronic switch $310_1$ is configured to connect the pull-up resistors $RPU_1$ to the pad RPb as a function of a signal $PU\_EN_1$, and a second electronic switch $310_2$ is configured to connect the pull-up resistors $RPU_2$ to the pad RPb as a function of a signal $PU\_EN_2$. Accordingly, in case the reset signal RESET is set to the first logic level (e.g., high), the combinational logic circuit 32b sets: when the bit B_STR_UP is set to a first logic level, the signal $PU\_EN_1$ to high and the signal $PU\_EN_2$ to low, thereby activating a weak pull-up resistance WPU; and when the bit B_STR_UP is set to a second logic level, the signal $PU\_EN_1$ to high and the signal $PU\_EN_2$ to high, thereby activating a strong pull-up resistance SPU.

In case the pull-up resistors $RPU_2$ have a value being significantly smaller than the pull-up resistors $RPU_1$, the combinational logic circuit 32b may also set the signal $PU\_EN_2$ to high when the bit B_STR_UP is set to the second logic level.

Generally, the circuity 30b may also comprise a single pull-up resistor RPU with respective switch 310, wherein: a weak pull-up resistance WPU is activated by closing the electronic switch 310 and disabling the output stage OS (via the signal OBE); and a strong pull-up resistance SPU is activated by opening the electronic switch 310, enabling the output stage OS (via the signal OBE) and setting the signal OUT to high, whereby the terminal RPb is connected to the supply voltage via a respective switch-on resistance of the driver 300.

Similarly, the pull-down resistance may be implemented with two pull-down resistors $RPD_1$ and $RPD_2$, wherein a first electronic switch $312_1$ is configured to connect the pull-down resistors $RPD_1$ to the pad RPb as a function of a signal $PD\_EN_1$, and a second electronic switch $312_2$ is configured to connect the pull-down resistors $RPD_2$ to the pad RPb as a function of a signal $PD\_EN_2$. Accordingly, in case the reset signal RESET is set to the second logic level (e.g., low), the combinational logic circuit 32b sets: when the bit B_STR_DOWN is set to a first logic level, the signal $PD\_EN_1$ to high and the signal $PD\_EN_2$ to low, thereby activating a weak pull-down resistance WPD; and when the bit B_STR_DOWN is set to a second logic level, the signal $PD\_EN_1$ to high and the signal $PD\_EN_2$ to high, thereby activating a strong pull-down resistance SPD.

Also in this case, the circuity 30b may also comprise a single pull-down resistor RPD with respective switch 312, wherein: a weak pull-down resistance WPD is activated by closing the electronic switch 312 and disabling the output stage OS (via the signal OBE); and a strong pull-down resistance SPD is activated by opening the electronic switch 312, enabling the output stage OS (via the signal OBE) and setting the signal OUT to low, whereby the terminal RPb is connected to ground via a respective switch-on resistance of the driver 300.

Weak and strong pull-up and pull-down resistances for the circuit 30a may also be similarly managed.

As described in the foregoing, indeed the configuration data MCD may not have been programmed yet when a reset is requested, such as a power-on reset. Accordingly, in the following will be described in detail possible embodiments of the configuration of the reset pads RPa and PRb.

Specifically, in the following it will be assumed that the reset management circuit 116a may be configured to execute a destructive reset DR and optionally a functional reset FR in response to given events. Specifically, while in a response to a power-on event PO (as signaled via the circuit 115), the reset management circuit 116a is configured to execute a destructive reset DR, and the reset type for one or more of the signals ERa, ERb, $IR_{1l}$ ... $IR_m$ may be configurable based on the mode configuration data MCDc. More specifically, as also mentioned before, the reset circuit 116a may be configured to: start a destructive reset DR in response to a reset signaled via the signal ERa (reset pad RPa); and start either a destructive reset DR or a functional reset FR in response to a reset signaled via the signal ERb (reset pad RPb), wherein the selection is performed based on the mode configuration data MCDc.

In this respect, when starting a destructive reset DR, the processing system 10a executes the following phases: the destructive reset DR at the step 3002; the configuration phase CP1; optionally the diagnostic phase DP and the functional reset FR at the step 3014; optionally the further configuration phase CP2; optionally a wait phase WP at the step 3020; and a software runtime phase SW, which is started at the step 3022.

Conversely, when starting a functional reset FR, the processing system 10a executes the following phases: the functional reset FR at the step 3014; optionally the configuration phase CP2; optionally the wait phase WP at the step 3020; and the software runtime phase SW, which is started at the step 3022.

As will be described in the following, one or more of these phases may be signaled to the combinational logic circuits 32a and/or 32b, i.e., the combinational logic circuits 32a and/or 32b may set one or more of the signals (e.g., OBE, OUT, PU_EN, PD_EN, and/or IBE) provided to the pad circuities 30a and 30b as a function of the reset phase. For example, the phase may be signaled explicitly via a dedicated signal, or implicitly by monitoring the signals used to manage the above phases, such as the signals RESET, RM, SCP, ECP, SDP, and EDP.

In the following will now be described first the operation of the reset pad RPa. Specifically, as described in the foregoing, a reset pad RPa may be configured as a bidirectional input/output terminal or output-only terminal. Specifically, for this purpose, the pad circuitry 30a is configured to selectively activate, e.g., as a function of the signals PU_EN and PD_EN: a weak pull-down resistance WPD (having a large resistance value); a strong pull-down resistance SPD (having a small resistance value); a weak pull-up resistance WPU (having a large resistance value); or a strong pull-up resistance SPU (having a small resistance value).

For example, as mentioned before, such pull-up and pull-down resistances may be implemented via: a variable pull-up resistor RPU and a variable pull-down resistor RPD; at least two pull-up resistors RPU and at least two pull-down resistors RPD, which may be activated via respective electronic switches; or a pull-up resistor activated via a switch 310 and pull-down resistor activated via a switch 312, wherein the output-stage OS is used to activate the strong pull-up or pull-down resistances.

In this respect, it is preferable that the reset pad RPa is configured by default as a bidirectional input/output terminal after powering on the processing system 10a (phase PO). In fact, in this way, the reset pad RPa may also receive a reset trigger before the configuration data are read during the phase CP1.

Figure 10:
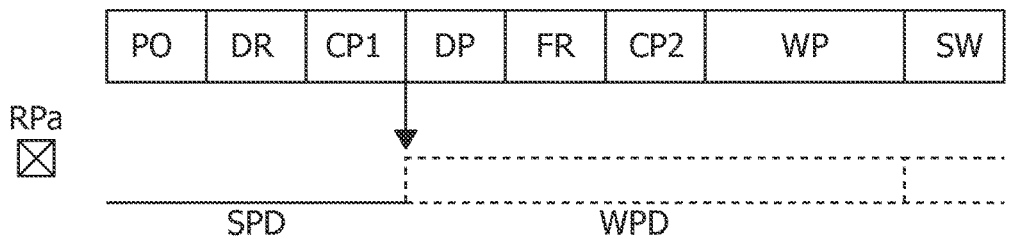
FIGS. 10 to 18 show embodiments of the configuration of the reset terminals and a reset generator circuit of FIG. 9.
Figure 11:
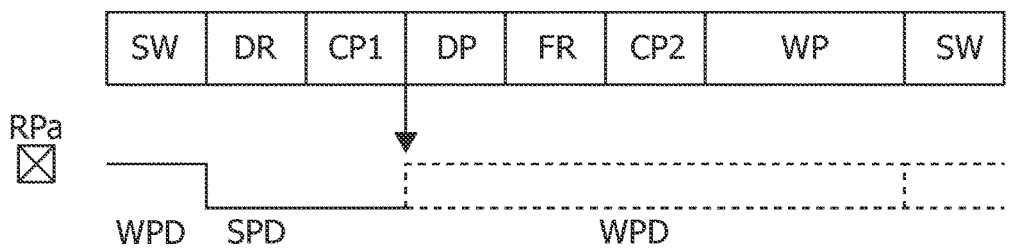
Figure 12:
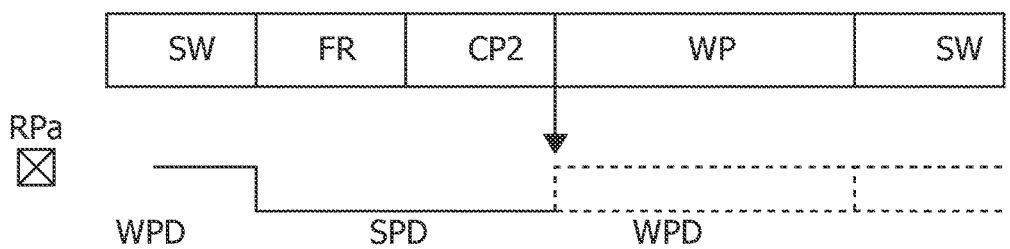

Specifically, FIGS. 10, 11 and 12 show the case where the mode configuration data MCDa indicate that the reset pad RPa should be configured as a bidirectional terminal. Specifically, in the embodiments considered, it is assumed that an external pull-up resistor is connected in this case to the terminal RPa.

FIG. 10 shows the behavior of the reset pad RPa in response to a power-on event PO.

As mentioned before, in the embodiment considered, the reset management circuit 116a is configured to start a destructive reset DR in response to a power-on event PO.

As shown in FIG. 10, in the embodiment considered, the combinational logic circuit 32a is configured to activate the strong pull-down resistance SPD when the processing system 10a is in the phases DR and CP1. Accordingly, assuming that the resistance value of the strong pull-down resistance SPD is smaller than the external pull-up resistor or in case an external pull-up resistor is missing, the pad RPa is set to low and the reset event is also signaled (via a logic low level) to possible external circuits connected to the pad RPa.

Accordingly, during the phase CP1, the configuration circuit 108 also reads the mode configuration data MCDa, and the mode configuration data MCDa may be used to change the behavior of the reset pad RPa. For example, as described in the foregoing, the mode configuration data MCDa may comprise the bit A_DIR, which is used to configure the reset pad as a bidirectional (I/O) reset terminal or as a (unidirectional) reset output terminal.

For example, when the bit A_DIR indicates that the pad is a bidirectional (I/O) reset terminal, the combinational logic circuit 32a may be configured to activate the weak pull-down resistance WPD. Accordingly, when configuring the reset pad RPa as a bidirectional terminal, the external pull-up resistor should have a value being greater than the strong pull-down resistance SPD and smaller than the weak pull-down resistance WPD. In fact, in this way, the external pull-up resistor will raise the logic level at the pad RPa to high, and an external circuit may signal a reset event by pulling the logic level at the pad RPa to low.

FIG. 11 shows an embodiment of the behavior of the pad RPa when the reset management circuit 116a generates then a destructive reset DR, e.g., in response to an internal reset event IR or an external reset event ER.

In the embodiment considered, the combinational logic circuit 32a is configured to again activate the strong pull-down resistance SPD when the processing system 10a is in the phases DR and CP1, and then the combinational logic circuit sets the mode (bidirectional or output) of the pad RPa as a function of the mode configuration data MCDa (see the description of FIG. 10), e.g., again activates the weak pull-down resistance WPD.

Generally, in response to a destructive reset being triggered in response to other events than the power-on event PO, the configuration circuit 108 may be configured to either re-read the mode configuration data of the reset circuit 116a and the reset pads RPa and RPb, or skip these data, whereby the mode configuration data of the reset circuit and the reset pads RPa and RPb are read in response to a power-on event PO.

FIG. 12 shows an embodiment of the behavior of the pad RPa when the reset management circuit 116a generates a functional reset FR, e.g., in response to an internal reset event IR or an external reset event ERb, or when executing a functional reset FR after a diagnostic phase DP.

In various embodiments, the combinational logic circuit 32a may be configured to either report the function reset FR to the pad RPa or not. For example, for this purpose may be used an additional bit in the mode configured data MCDa.

For example, in case the functional reset should not be signaled, the combinational logic circuit 32a does not change, during the functional reset phase FR and the optional configuration phase CP2, the signals provided to the pad circuitry 30a, e.g., the combinational logic circuit 30a maintains the weak pull-down WPD activated.

Conversely, as shown in FIG. 12, in case the functional reset should be signaled, the combinational logic circuit 32a may again activate the strong pull-down SPD during the functional reset phase FR and the optional configuration phase CP2, and then activate again the weak pull-down WPD.

Figure 13:
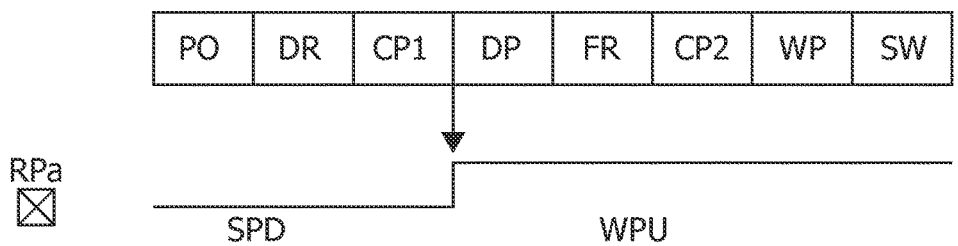
Figure 14:
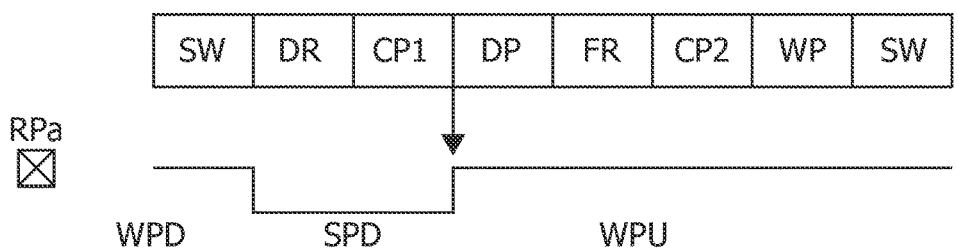
Figure 15:
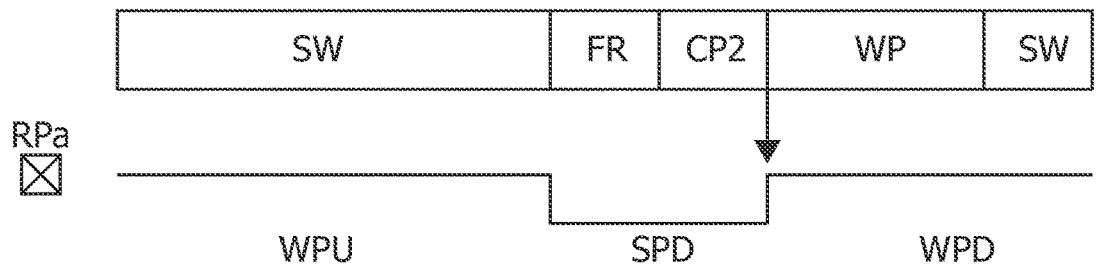

Conversely, FIGS. 13, 14 and 15 show the case, where the mode configuration data MCDa indicate that the reset pad RPa should be configured as output terminal.

Specifically, FIG. 13 shows again the behavior of the reset pad RPa in response to a power-on event PO.

As described with respect to FIG. 10, in the embodiment considered, the reset management circuit 116a is configured to start a destructive reset in response to a power-on event PO. Accordingly, in the embodiment considered, the combinational logic circuit 32a is configured to again activate the strong pull-down resistance SPD when the processing system 10a is in the phases DR and CP1. Moreover, during the phase CP1, the configuration circuit 108 also reads the mode configuration data MCDa. For example, when the bit A_DIR indicates that the pad is an output reset terminal, the combinational logic circuit 32a may be configured to activate the weak pull-up resistance WPU at the end of the configuration phase CP1, whereby the logic level of the reset pad RPa changes to high.

FIG. 14 shows an embodiment of the behavior of the pad RPa when the reset management circuit 116a then generates a destructive reset DR, e.g., in response to an internal reset event IR or an external reset event ER.

Accordingly, also in this case the combinational logic circuit 30a will again activate the strong pull-down resistance SPD when the processing system 10a is in the phases DR and CP1, and then re-activate the weak pull-up resistance WPU, thereby changing the logic level at the pad RPa to high.

Finally, FIG. 15 shows an embodiment of the behavior of the pad RPa when the reset management circuit 116a generates a functional reset FR, e.g., in response to an internal reset event IR or an external reset event ERb, or when executing a functional reset FR after a diagnostic phase DP.

As described with respect to FIG. 12, such a functional reset may be signaled or not. For example, as shown in FIG. 15, in case the functional reset should be signaled, the combinational logic circuit 32a may again activate the strong pull-down SPD during the functional reset phase FR and the optional configuration phase CP2, and then activate again the weak pull-up WPU.

Accordingly, in the embodiments considered, the combinational logic circuit 32a is configured to: during the destructive reset DR and the configuration phase CP1, and optionally during the functional reset FR and the optional configuration phase CP2, activate the strong pull-down SPD; and during the other phases, in particular the software runtime phase SW, either activate the weak-pull down WPD (bidirectional terminal) or the weak pull-up WPU (output terminal) as a function of the mode configuration data MCDa.

Accordingly, in the embodiment considered, the strong pull-up SPU is indeed unused and may be omitted.

Generally, when the pad RPa is configured as a bidirectional terminal, the weak-pull down WPD could also be deactivated, because the logic level is set externally via the external pull-up and other circuits pulling the logic level at the pad RPa to low. However, by activating the weak-pull down WPD, the processing system 10a will be maintained via the weak-pull down WPD in the reset state when the pad RPa is disconnected. In fact, when the pad RPa is configured as a bidirectional terminal, in case the connection between the reset pad and the pin or ball is broken, the processing system 10 should be in a safe state, which in this case is to keep it under reset.

In the following will now be described the operation of a reset pad RPb. As described in the foregoing, in various embodiments, the reset pad RPb may be configured, as a function of the mode configuration data MCDb, as an input reset pad, output reset pad or as a General-Purpose I/O pad. In various embodiments, in case the reset pad RPb is configured as a reset input, it may be possible to configure, as a function of the mode configuration data MCDc, whether a destructive or a functional reset is generated.

Generally, similar to the reset pad RPa, also the reset pad RPb has a default configuration, which determines the pad behavior after a power-on PO. For example, in various embodiments, the combinational logic circuit 32b is configured to configure the reset pad RPa as a unidirectional input reset when the mode configuration data MCDb have their reset value, e.g., the respective bits are set to 0. Moreover, the reset circuit 116a may be configured to generate a destructive reset in response to the signal ERb when the mode configuration data MCDc have their reset value, e.g., the respective bits are set to 0.

Specifically, such a default configuration is useful because the reset pad RPa is configured by default as a bidirectional reset pad (generating a destructive reset). However, in some applications a unidirectional reset input may be used, e.g., because the respective pad is not connected to an external pull-up and selectively connected to the supply voltage VDD or ground GND. Thus, using a strong pull-down SPD as described with respect to the pad RPa may not be suitable.

Figure 16:
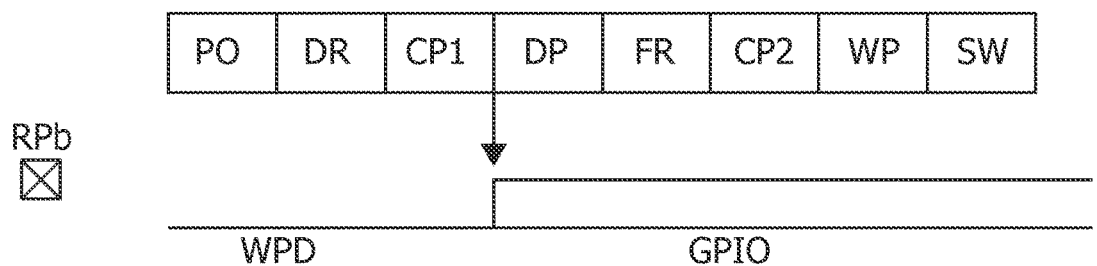
Figure 17:
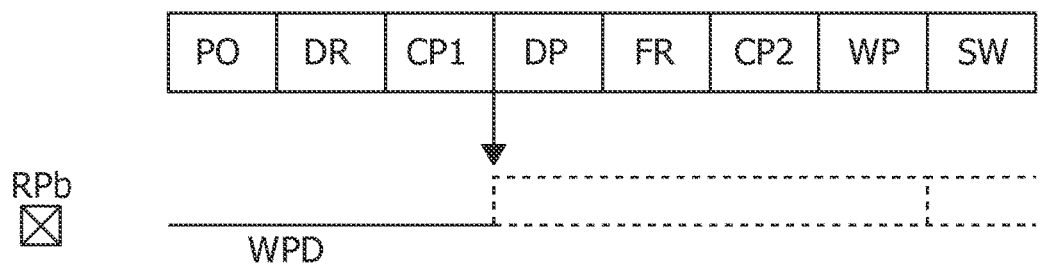
Figure 18:
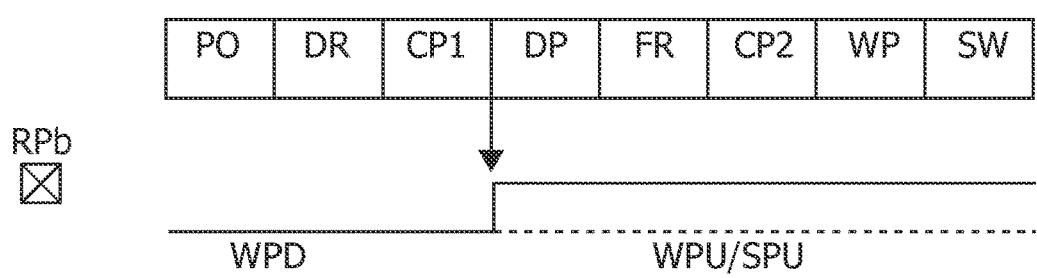

FIGS. 16, 17 and 18 show now possible configurations of the reset pad RPb.

Generally, as mentioned before, the reset pad RPb is configured, via the combinational logic circuit 32b, by default as unidirectional reset input. Specifically, in various embodiments, apart from enabling the input stage IS, the combinational logic circuit 32b may also activate the weak pull-down resistance WPD. In fact, in this way, the circuit is kept under reset when the pad RPb is disconnected. Specifically, due to the fact that the pad RPb is configured by default as input, the reset during the phase DR is not signaled via a strong pull-down SPD, as occurred for the pad RPa, but the weak pull-down is used to maintain the processing circuit 10a in a safe state when the pad RPb is disconnected.

Thus, as shown in FIGS. 16, 17 and 18, the combinational logic circuit 32b may be configured to enable the weak-pull down WPD during the destructive reset DR and the configuration phase CP1.

Next, once the mode configuration data MCDb and MCDc have been read, the combinational logic circuit 32b may drive the pad circuitry 30b as a function of the mode configuration data MCDb, and the reset circuit may use the reset behavior specified via the mode configuration data MCDc. Specifically, similar to the mode configuration data MCDa, the processing system 10a may be configured to update the mode configuration data MCDb and MCDc in response to a power on, and not in response to further destructive and functional resets. For example, for this purpose: the configuration circuit 108 may be configured to read the mode configuration data MCBa, MCDb and MCDc in response to a power on PO; and/or the configuration data client(s) used to store the mode configuration data MCBa, MCDb and MCDc may be configured to maintain their values in response to a destructive and a function reset and permit a single write operation.

For example, in FIG. 16, the mode configuration data MCDb indicate that the reset pad RPb should be configured as General-Purpose I/O. As mentioned before, in this case the pad RPb may be driven via a processing core 102 or a peripheral 106. For example, the connection of the reset pad RPb to a processing core 102 or a peripheral 106 may be specified via the configuration data CD and/or by programming a register interface via a processing core 102. As mentioned before, the processing system 10a may be configured to maintain this configuration until the next power-on.

Conversely, in FIG. 17, the mode configuration data MCDb indicate that the reset pad RPb should be configured as unidirectional input. Specifically, as mentioned before, in this case, the combinational logic circuit 32b may maintain the weak-pull down resistance WPD as being activated.

Preferably, also in this case, the reset pad RPb is connected via an external pull-up to the supply voltage VDD, and a circuit may request a reset by pulling the logic level at the pad RPb to ground GND.

As described in the foregoing, in various embodiments, the mode configuration data MCDc may be used to specify whether a reset signaled via the signal ERb (provided by the input stage IS of the circuitry 30b) should generate a destructive or a functional reset, i.e., the reset event ERb may trigger the destructive reset described with respect to FIG. 11 or the functional reset described with respect to FIG. 12.

Finally, in FIG. 18, the mode configuration data MCDb indicate that the reset pad RPb should be configured as unidirectional output.

In general, when the pad RPb is configured as reset output, the reset state may be signaled by: during the destructive reset DR and the configuration phase CP1, and optionally during the functional reset FR and the optional configuration phase CP2, activating the weak pull-down WPD or the strong pull-down SPD; and during the other phases, in particular the software runtime phase SW, activating the weak pull-up WPU or the strong pull-up SPU.

Generally, the selection may be hardwired, e.g., the combinational logic circuit 32b may use the weak pull-down WPD and the weak pull-up WPU. Alternatively, as mentioned before, the mode configuration data MCDb may also comprise for this purpose: the bit B_STR_UP, which is used to configure (in case the bit B_GPIOEN indicates that the pad RPB is a reset terminal and the bit B_DIR indicates that the pad RPB is a reset output terminal) whether the weak pull-up WPU (e.g., B_STR_UP="0") or the strong pull-up SPU (e.g., B_STR_UP="1") should be activated; and/or the bit B_STR_DOWN, which is used to configure (in case the bit B_GPIOEN indicates that the pad RPB is a reset terminal and the bit B_DIR indicates that the pad RPB is a reset output terminal) whether the weak pull-down WPD (e.g., B_STR_DOWN="0") or the strong pull-down SPD (e.g., B_STR_DOWN="1") should be activated.

Generally, as mentioned before, in response to a power on PO, the weak pull-down WPD is used. Accordingly, the above configuration applies once the mode configuration data MCDb have been read.

Moreover, in line with the description of FIG. 12, the combinational logic circuit 32b may also be configured to either report the function reset FR to the pad RPb or not. For example, for this purpose may be used an additional bit in the mode configured data MCDb.

For example, in case the functional reset FR should not be signaled, the combinational logic circuit 32b does not change during the functional reset phase FR and the optional configuration phase CP2 the signals provided to the pad circuitry 30b, e.g., the combinational logic circuit 30b maintains the weak pull-up WPU or the strong pull-up SPU activated (e.g., as a function of the bit B_STR_UP).

Conversely, as shown in FIG. 12, in case the functional reset should be signaled, the combinational logic circuit 32a may activate the weak pull-down WPD or the strong pull-down SPD (e.g., as a function of the bit B_STR_DOWN) during the functional reset phase FR and the optional configuration phase CP2, and then again activate the weak pull-up WPU or the strong pull-up SPU (e.g., as a function of the bit B_STR_UP).

Accordingly, in various embodiments, in response to switching on the processing system 10a (as signaled, e.g., via the circuit 115), the processing system 10a is configured to execute (at least) the following phases: the reset phase DR, wherein a reset of the processing system 10a is performed; the configuration phase CP1, wherein the configuration circuit 108 reads the configuration data CD, and the software runtime phase SW.

In the embodiments considered, the reset pad RPa has a circuitry 30a and 32a associated therewith and configured to: during the reset phase DR and the configuration phase CP1, activate the strong pull-down SPD; and during the software runtime phase SW: activate the weak pull-down WPD when the mode configuration data MDCa indicate that the pad RPa should be configured as a bidirectional terminal, or activate the weak pull-up WPU when the mode configuration data MDCa indicate that the pad RPa should be configured as unidirectional reset output.

Conversely, in the embodiments considered, the reset pad RPb has circuitry 30b and 32b associated therewith and configured to: during the reset phase DR and the configuration phase CP1, activate the weak pull-down WPD; and during the software runtime phase SW: activate the weak pull-up WPU or the strong pull-up SPU when the mode configuration data MDCb indicate that the pad RPb should be configured as unidirectional reset output terminal, maintain the weak pull-down WPD as being activated when the mode configuration data MDCb indicate that the pad RPb should be configured as unidirectional reset input terminal, and optionally configure the pad RPb as General Purpose I/O pad when the mode configuration data MDCb indicate that the pad RPb should be configured as General Purpose I/O.

Without prejudice to the principle of this disclosure, the details of construction and the embodiments may vary widely with respect to what has been described and illustrated herein purely by way of example, without thereby departing from the scope of the present disclosure, as defined by the ensuing claims.

For example, while the previous description mainly refers to a reset event being signaled at the pads RPa and RPb via a logic low level, the reset event could also be signaled via a logic high level. In this case, the role of the pull-up and pull-down resistors would be inverted, e.g.: in FIGS. 10, 11 and 12 would be activated a strong pull-up SPU and then a weak pull-up WPU (instead of the strong pull-down SPD and then a weak pull-down WPD); and in FIGS. 13, 14 and 15 would be activated a strong pull-up SPU and then a weak pull-down WPD (instead of the strong pull-down SPD and then a weak pull-up WPU).

Moreover, as described in the foregoing, the strong pull-up and pull-down resistances may be implemented indeed via the output stage OS.

The invention claimed is:

1. A processing system, comprising:
 a digital processing core comprising a microprocessor configured to execute software instruction;
 a reset circuit configured to selectively reset said processing system;
 a non-volatile memory having stored configuration data;
 a plurality of configuration data clients, each configuration data client comprising a register for storing configuration data;
 a hardware configuration circuit configured to read said configuration data from said non-volatile memory and transmit said configuration data to said plurality of configuration data clients;
 wherein, in response to switching on said processing system, said processing system is configured to execute the following phases in sequence:
  a reset phase, where said reset circuit executes a reset of said processing system;
  a configuration phase, where said hardware configuration circuit reads said configuration data from said non-volatile memory and transmits said configuration data to at least one of said plurality of configuration data clients; and
  a software runtime phase, where said microprocessor is started and executes software instruction;
 wherein said processing system further comprises:
  a first reset terminal and a first circuitry, wherein said first circuitry comprises:
   an input stage configured to generate a first binary signal as a function of a voltage at said first reset terminal;
   a pull-up resistance of the first circuitry connected between said first reset terminal and a supply voltage, said pull-up resistance of the first circuitry configured to be selectively enabled;
   a first pull-down resistance of the first circuitry connected between said first reset terminal and ground, said first pull-down resistance of the first circuitry configured to be selectively enabled; and
   a second pull-down resistance of the first circuitry connected between said first reset terminal and ground, said second pull-down resistance of the first circuitry configured to be selectively enabled, wherein said second pull-down resistance of the first circuitry has a resistance value smaller than a resistance value of said first pull-down resistance of the first circuitry; and
  a second reset terminal and a second circuitry, wherein said second circuitry comprises:
   an input stage configured to generate a second binary signal as a function of a voltage at said second reset terminal;
   a first pull-up resistance of the second circuitry connected between said second reset terminal and the supply voltage, said first pull-up resistance of the second circuitry configured to be selectively enabled;
   a second pull-up resistance of the second circuitry connected between said second reset terminal and the supply voltage, said second pull-up resistance of the second circuitry configured to be selectively enabled, wherein said second pull-up resistance of the second circuitry has a resistance value smaller than a resistance value of said first pull-up resistance of the second circuitry;

a first pull-down resistance of the second circuitry connected between said second reset terminal and ground, said first pull-down resistance of the second circuitry configured to be selectively enabled; and a second pull-down resistance of the second circuitry connected between said second reset terminal and ground, said second pull-down resistance of the second circuitry configured to be selectively enabled, wherein said second pull-down resistance of the second circuitry has a resistance value smaller than the resistance value of said first pull-down resistance of the second circuitry;

wherein during said reset phase and said configuration phase:
said first circuitry is configured to enable said second pull-down resistance of said first circuitry; and
said second circuitry is configured to enable said first pull-down resistance of said second circuitry; and
wherein said first circuitry and said second circuitry each respectively have at least one of said plurality of configuration data clients associated therewith, and wherein said configuration data comprise first mode configuration data for said first reset terminal and second mode configuration data for said second reset terminal, whereby said first mode configuration data and said second mode configuration data are transmitted to at least one of said plurality of configuration data clients during said configuration phase; and wherein during said software runtime phase:
said first circuitry is configured to:
when said first mode configuration data indicate that said first reset terminal is to be configured as a bidirectional reset terminal, configure said first reset terminal as a bi-directional reset terminal and activate the first pull-down resistance of said first circuitry; and
enable said pull-up resistance of said first circuitry when said first mode configuration data indicate that said first reset terminal is to be configured as reset output terminal; and
said second circuitry is configured to:
when said second mode configuration data indicate that said second reset terminal is to be configured as reset output terminal, configure said second reset terminal as a bi-directional reset terminal and activate the second pull-down resistance of said second circuitry; and
maintain enabled said first pull-down resistance of said second circuitry when said second mode configuration data indicate that said second reset terminal is to be configured as reset input terminal.

2. The processing system according to claim 1, wherein:
said first circuitry comprises a pull-up resistor having a first terminal connected to the supply voltage and a second terminal connected via a first electronic switch to said first reset terminal, thereby implementing said pull-up resistance, a first pull-down resistor having a first terminal connected to ground and a second terminal connected via a second electronic switch to said first reset terminal, thereby implementing said first pull-down resistance, and a second pull-down resistor having a first terminal connected to ground and having a second terminal connected via a third electronic switch to said first reset terminal, thereby implementing said second pull-down resistance; and/or said second circuitry comprises a first pull-up resistor having a first terminal connected to the supply voltage and a second terminal connected via a first electronic switch to said second reset terminal, thereby implementing said first pull-up resistance, a second pull-up resistor having a first terminal connected to the supply voltage and a second terminal connected via a second electronic switch to said second reset terminal, thereby implementing said second pull-up resistance, a first pull-down resistor having a first terminal connected to ground and having a second terminal connected via a third electronic switch to said second reset terminal, thereby implementing said first pull-down resistance, and a second pull-down resistor having a first terminal connected to ground and a second terminal connected via a fourth electronic switch to said second reset terminal, thereby implementing said second pull-down resistance.

3. The processing system according to claim 1, wherein:
said first circuitry comprises a pull-up resistor having a first terminal connected to the supply voltage and a second terminal connected via a first electronic switch to said first reset terminal, thereby implementing said pull-up resistance, a pull-down resistor having a first terminal connected to ground and a second terminal connected via a second electronic switch to said first reset terminal, thereby implementing said first pull-down resistance, and an output stage configured to selectively connect said first reset terminal to a ground, thereby implementing said second pull-down resistance; and/or said second circuitry comprises a pull-up resistor having a first terminal connected to the supply voltage and a second terminal connected via a first electronic switch to said second reset terminal, thereby implementing said first pull-up resistance, a pull-down resistor having a first terminal connected to ground and a second terminal connected via a second electronic switch to said second reset terminal, thereby implementing said first pull-down resistance, and an output stage configured to selectively connect said first reset terminal to the supply voltage or a ground, thereby implementing said second pull-up resistance and said second pull-down resistance.

4. The processing system according to claim 1, wherein said second circuitry is configured, when said second mode configuration data indicate that said second terminal is to be configured as reset output terminal, to activate said first pull-up resistance of said second circuitry or said second pull-up resistance of said second circuitry as a function of said second mode configuration data.

5. The processing system according to claim 1, wherein said processing system is configured to execute one or more of the following phases between said configuration phase and said software runtime phase:
a diagnostic phase, wherein a diagnostic circuit of said processing system executes one or more diagnostic operations;
a further reset phase, where said reset circuit executes a further reset of said processing system;
a further configuration phase, where said hardware configuration circuit reads again said configuration data from said non-volatile memory and transmits said configuration data again to at least one of said plurality of configuration data clients, and
a wait phase, wherein said processing system waits until a first external reset signal received via the input stage of said first circuitry or a second external reset signal received via the input stage of said first circuitry is de-asserted.

6. The processing system according to claim 5, wherein said processing system is configured to monitor a first reset request signal, and in response to determining that said first reset request signal is set, execute at least the following phases in sequence:

said reset phase, where said reset circuit executes a reset of said processing system;

said configuration phase, where said hardware configuration circuit reads said configuration data from said non-volatile memory and transmits said configuration data to at least one of said plurality of configuration data clients; and said software runtime phase, where said microprocessor is started and executes software instruction.

7. The processing system according to claim 6, wherein said processing system is configured to monitor a second reset request signal, and in response to determining that said second reset request signal is set, execute at least the following phases in sequence:

said further reset phase, where said reset circuit executes a further reset of said processing system; and said software runtime phase, where said microprocessor is started and executes software instruction.

8. The processing system according to claim 7, wherein said reset circuit has at least one of the plurality of configuration data clients associated therewith, and wherein said configuration data comprise third mode configuration data for said reset circuit, and wherein said first external reset signal is a first reset request signal, and said second external reset signal is a first reset request signal or a second reset request signal as a function of said second mode configuration data.

9. The processing system according to claim 1, wherein said second circuitry is configured to configure said second reset terminal as General-Purpose I/O, when said second mode configuration data indicate that said second reset terminal is to be configured as a General-Purpose I/O.

10. The processing system of claim 1, wherein the processing system is arranged within an integrated circuit.

11. A method of operating the processing system of claim 1, comprising:

writing configuration data to said non-volatile memory, wherein said configuration data comprise said first reset mode configuration data for said first reset terminal and said second mode configuration data for said second reset terminal; and powering on said processing system such that said processing system executes said reset phase, said configuration phase, and said software runtime phase.

12. A device comprising a plurality of processing systems connected via a communication system, each of the plurality of processing systems comprising the processing system of claim 1.

13. The device of claim 12, wherein the device is configured to define a vehicle.

14. A processing system, comprising:

a microprocessor;

a reset circuit;

a non-volatile memory having configuration data stored therein;

a plurality of configuration data clients;

a hardware configuration circuit configured to read the configuration data from the non-volatile memory and transmit the configuration data to the plurality of configuration data clients;

wherein the processing system, in response to startup thereof, executes at least a reset phase and a configuration phase;

a first reset terminal associated with first circuitry;

a second reset terminal associated with second circuitry;

wherein the first circuitry and the second circuitry have at least one of the plurality of configuration data clients respectively associated therewith;

wherein the configuration data comprise first mode configuration data for the first reset terminal and second mode configuration data for the second reset terminal;

wherein, during the reset phase and the configuration phase, the first circuitry enables a strong pull-down resistance, and the second circuitry enables a weak pull-down resistance.

15. The processing system of claim 14, wherein the processing system, in response to startup thereof, also executes a software runtime phase; wherein, upon completion of the configuration phase, and during the software runtime phase, the first circuitry enables a weak pull-down resistance or a weak pull-up resistance, and the second circuitry enables a weak pull-up resistance or a strong pull-up resistance or maintains the weak pull-down resistance as being enabled.

16. The processing system of claim 15, wherein the first circuity implements a bi-directional reset terminal by enabling the weak pull-down resistance during the software runtime phase.

17. The processing system of claim 15, wherein the first circuitry implements a reset output terminal by enabling the weak pull-up resistance during the software runtime phase.

18. The processing system of claim 15, wherein the second circuitry implements a reset output terminal by activating the weak pull-up resistance or the strong pull-up resistance during the software runtime phase.

19. The processing system of claim 15, wherein the second circuitry implements a reset input terminal by activating the weak pull-down resistance during the software runtime phase.

20. The processing system of claim 15, wherein in the reset phase, said reset circuit executes a reset of said processing system; wherein in the configuration phase, said hardware configuration circuit reads said configuration data from said non-volatile memory and transmits said configuration data to the plurality of configuration data clients; and wherein in said software runtime phase, said microprocessor is started and executes software instruction.

21. A processing system, comprising:

a digital processing core comprising a microprocessor configured to execute software instruction;

a reset circuit configured to selectively reset said processing system;

a non-volatile memory having stored configuration data;

a plurality of configuration data clients, each configuration data client comprising a register for storing configuration data;

a hardware configuration circuit configured to read said configuration data from said non-volatile memory and transmit said configuration data to said plurality of configuration data clients;

wherein, in response to switching on said processing system, said processing system is configured to execute the following phases in sequence:

a reset phase, where said reset circuit executes a reset of said processing system;

a configuration phase, where said hardware configuration circuit reads said configuration data from said non-volatile memory and transmits said configuration data to at least one of said plurality of configuration data clients; and a software runtime phase, where said microprocessor is started and executes software instruction;

wherein said processing system further comprises:

a first reset terminal and a first circuitry, wherein said first circuitry comprises:

an input stage configured to generate a first binary signal as a function of a voltage at said first reset terminal;

a pull-up resistance of the first circuitry connected between said first reset terminal and a supply voltage, said pull-up resistance of the first circuitry configured to be selectively enabled;

a first pull-down resistance of the first circuitry connected between said first reset terminal and ground, said first pull-down resistance of the first circuitry configured to be selectively enabled; and a second pull-down resistance of the first circuitry connected between said first reset terminal and ground, said second pull-down resistance of the first circuitry configured to be selectively enabled, wherein said second pull-down resistance of the first circuitry has a resistance value smaller than a resistance value of said first pull-down resistance of the first circuitry; and wherein during said reset phase and said configuration phase:

said first circuitry is configured to enable said second pull-down resistance of said first circuitry; and wherein said first circuitry has at least one of said plurality of configuration data clients associated therewith, and wherein said configuration data comprise first mode configuration data for said first reset terminal, whereby said first mode configuration data is transmitted to at least one of said plurality of configuration data clients during said configuration phase.

22. The processing system of claim 21, wherein during said software runtime phase:

said first circuitry is configured to:

when said first mode configuration data indicate that said first reset terminal is to be configured as a bidirectional reset terminal, configure said first reset terminal as a bi-directional reset terminal and activate the first pull-down resistance of said first circuitry; and enable said pull-up resistance of said first circuitry when said first mode configuration data indicate that said first reset terminal is to be configured as reset output terminal.

23. The processing system of claim 21, further comprising:

a second reset terminal and a second circuitry, wherein said second circuitry comprises:

an input stage configured to generate a second binary signal as a function of a voltage at said second reset terminal;

a first pull-up resistance of the second circuitry connected between said second reset terminal and the supply voltage, said first pull-up resistance of the second circuitry configured to be selectively enabled;

a second pull-up resistance of the second circuitry connected between said second reset terminal and the supply voltage, said second pull-up resistance of the second circuitry configured to be selectively enabled, wherein said second pull-up resistance of the second circuitry has a resistance value smaller than a resistance value of said first pull-up resistance of the second circuitry;

a first pull-down resistance of the second circuitry connected between said second reset terminal and ground, said first pull-down resistance of the second circuitry configured to be selectively enabled; and a second pull-down resistance of the second circuitry connected between said second reset terminal and ground, said second pull-down resistance of the second circuitry configured to be selectively enabled, wherein said second pull-down resistance of the second circuitry has a resistance value smaller than the resistance value of said first pull-down resistance of the second circuitry.

24. The processing system of claim 23, wherein during said reset phase and said configuration phase:

said second circuitry is configured to enable said first pull-down resistance of said second circuitry; and wherein said second circuitry has at least one of said plurality of configuration data clients associated therewith, and wherein said configuration data comprise second mode configuration data for said second reset terminal, whereby said second mode configuration data is transmitted to at least one of said plurality of configuration data clients during said configuration phase.

25. The processing system of claim 24, wherein during said software runtime phase said second circuitry is configured to:

when said second mode configuration data indicate that said second reset terminal is to be configured as reset output terminal, configure said second reset terminal as a bi-directional reset terminal and activate the second pull-down resistance of said second circuitry; and maintain enabled said first pull-down resistance of said second circuitry when said second mode configuration data indicate that said second reset terminal is to be configured as reset input terminal.

* * * * *